May 18, 1926. 1,584,964
C. P. WELLMAN
RECEPTACLE MAKING MACHINE
Filed July 7, 1919   10 Sheets-Sheet 6
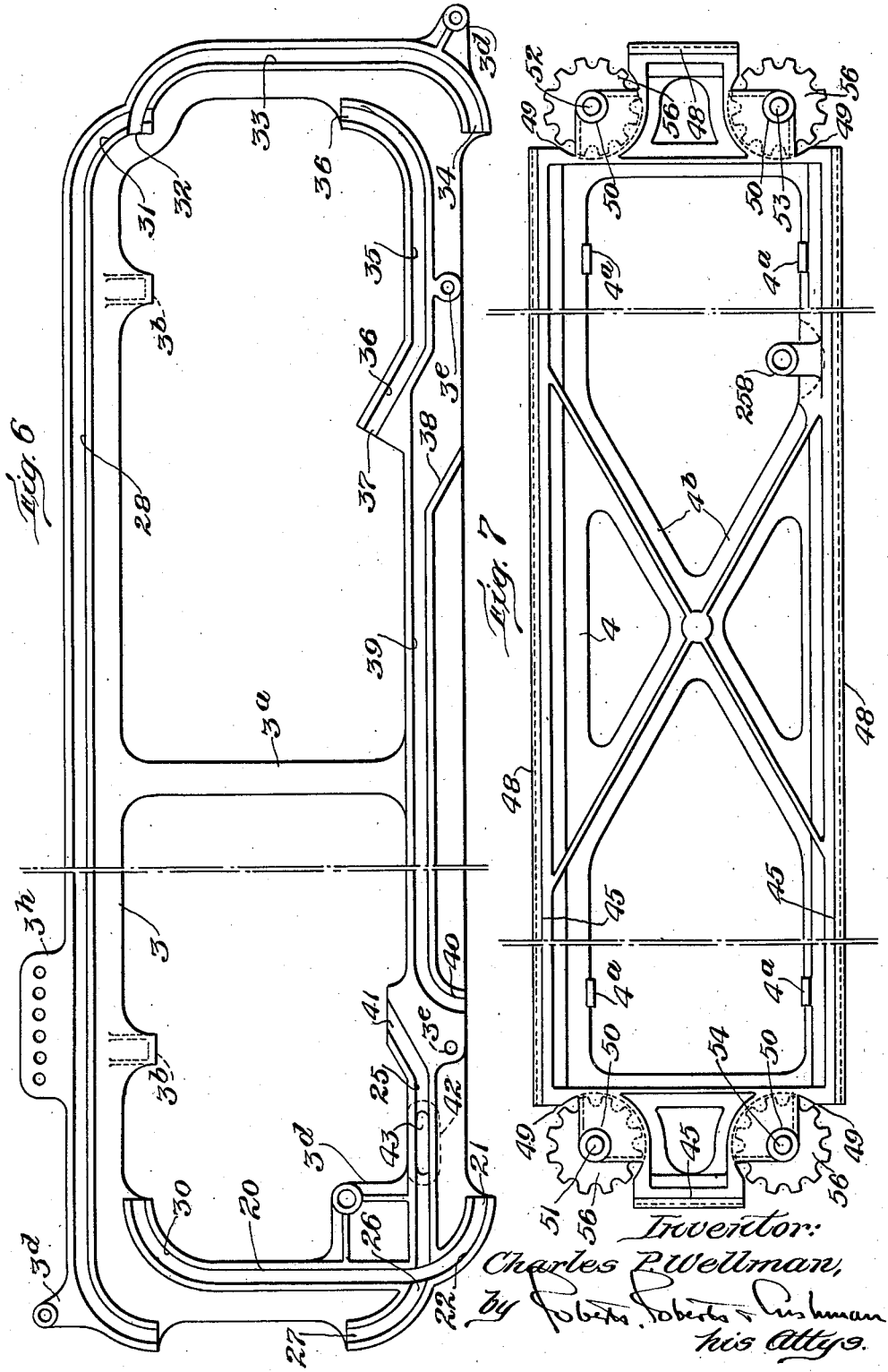

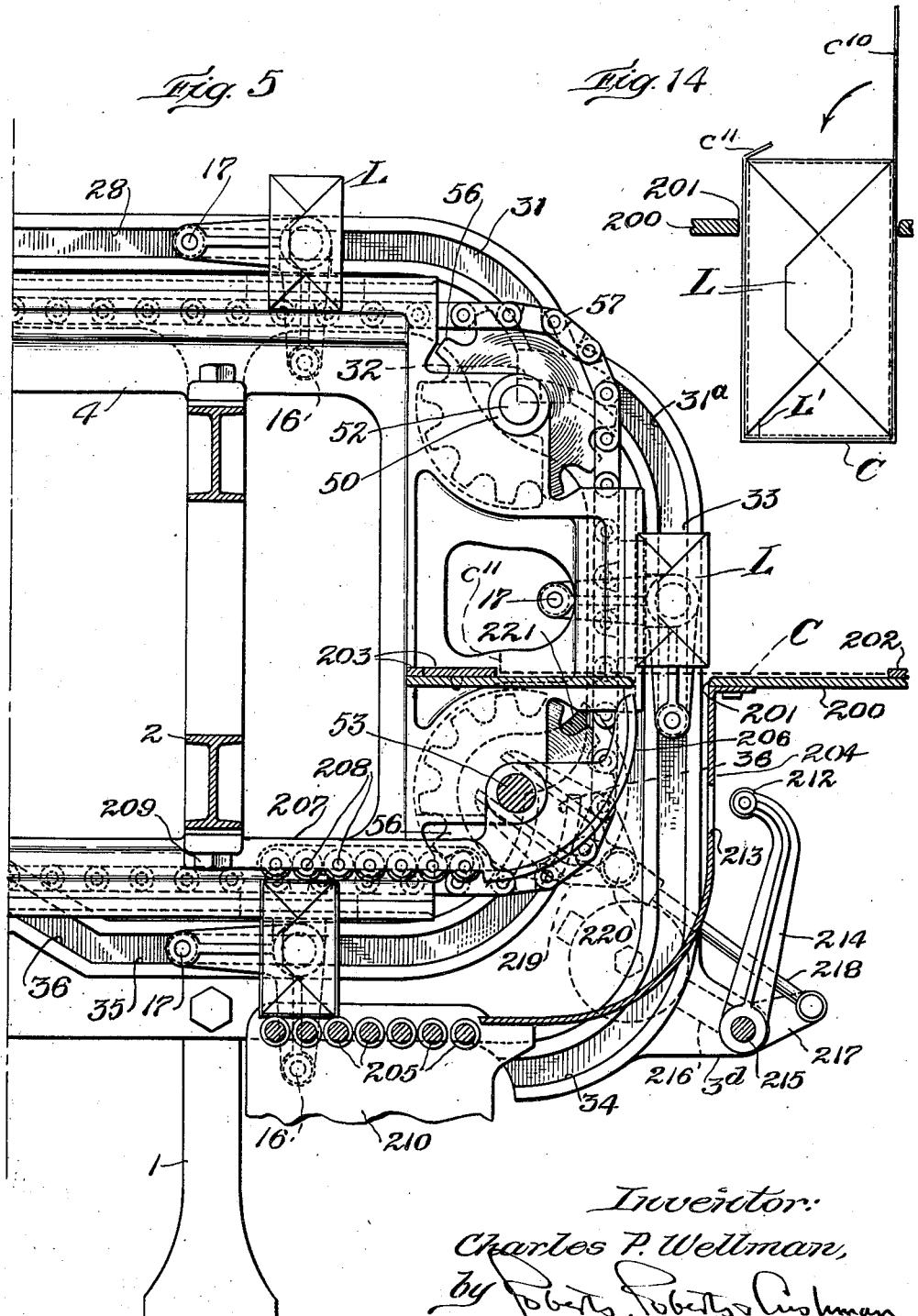

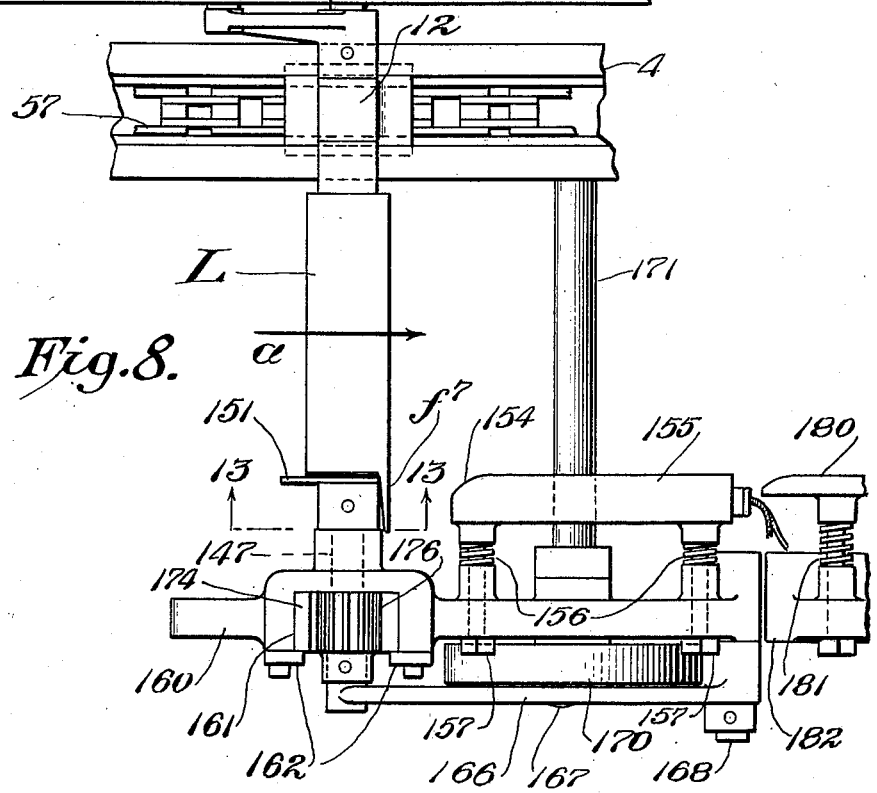

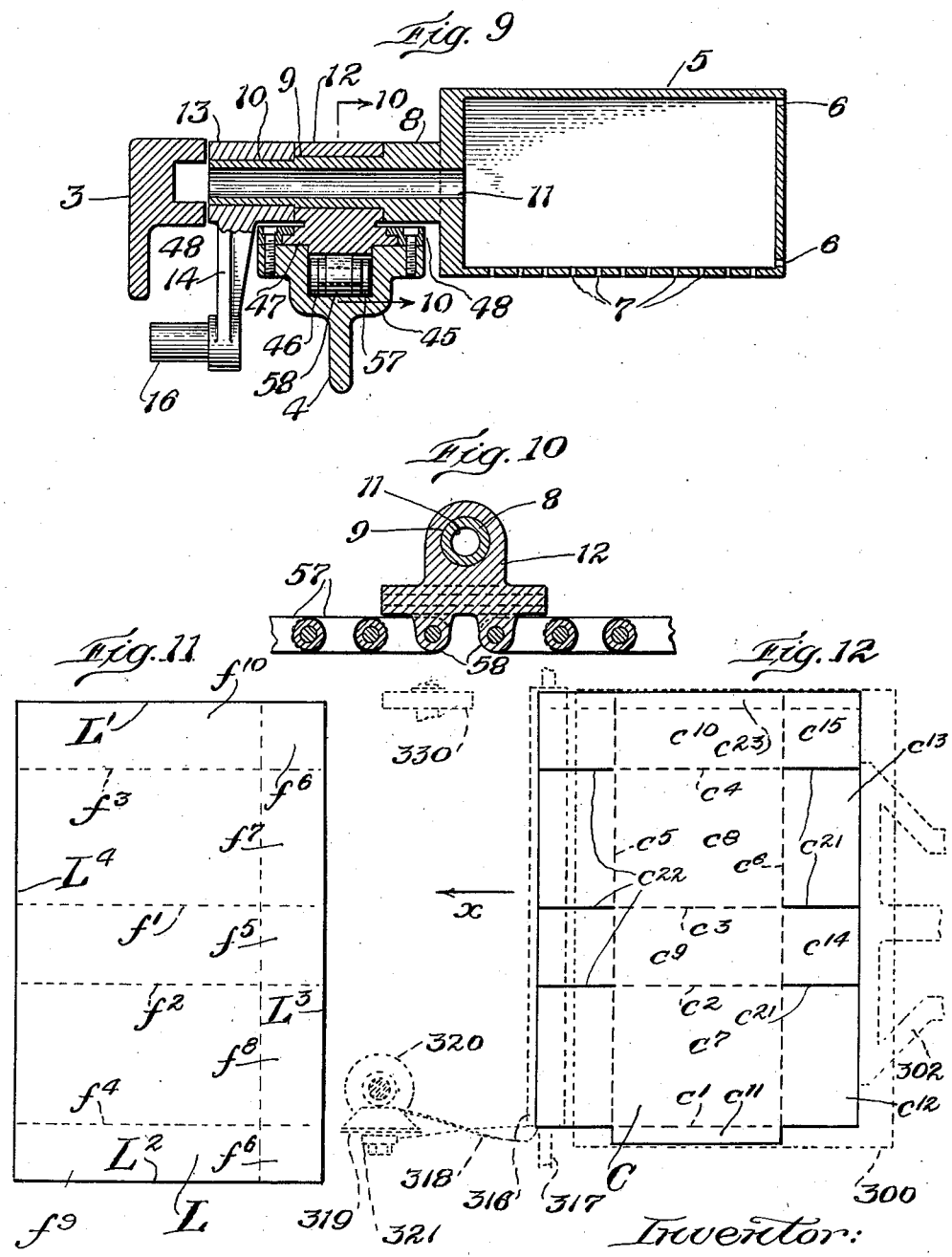

May 18, 1926.

C. P. WELLMAN

RECEPTACLE MAKING MACHINE

Filed July 7, 1919

Inventor:
Charles P. Wellman,
by Roberts Roberts Cushman
his Attys.

Inventor:
Charles P. Wellman,
by Roberts, Roberts & Cushman
his Attys.

Patented May 18, 1926.

1,584,964

UNITED STATES PATENT OFFICE.

CHARLES P. WELLMAN, OF WEST MEDFORD, MASSACHUSETTS.

RECEPTACLE-MAKING MACHINE.

Application filed July 7, 1919. Serial No. 309,115.

This invention relates to devices for making up from sheets or lengths of paper, cardboard or other sheet material a relatively complete receptacle or vessel for packaging, storing or shipping contained commodities.

It becomes more and more the custom to pack and ship perishable articles, or articles necessarily kept clean such as food products, in receptacles designed both to strongly contain the enclosed material and to protect the enclosed material from loss of weight by evaporation, contamination by exposure to the air or from contamination by exposure to the material of the container itself when it is desired that the container shall be of a material affecting in any way the contents. Sometimes the contents contain elements such as moisture or oil reacting upon the container to soil or destroy the same. In all cases, capacity to print labels or trade marks or to decorate the surfaces of the outer container is of commercial importance.

In any of these situations it is desirable to provide an impervious lining for the container of such materials so treated as to prevent the container from affecting the contents, or the contents affecting the container, and this having been done it is possible to form the exterior container of cheap, strong and serviceable material without reference to its relation to the kind of material intended to be contained in it. Instances of the classes of commodities which have either to be protected from the container or which have to be shipped in a container adapted to be protected from the commodity are familiar to all users of food products in the bulk. For instance, among ground materials such spices as ginger sift or work out of any but the most impervious containers, and spoil the other packages, or evaporate their volatile flavoring constituents. Coffee evaporates except in an impervious container, and emits such a strong odor as to affect other absorbent foods. Tobacco manufactures and bakery products lose their moisture at a high rate when in a pervious package. Such ready-cooked foods as potato chips and other fried things have some of their retained grease absorbed by an absorbent paper container unless protected. Candies adhere to the container unless protected from it, and then are apt to be torn open by their own weight. Fluids, semi-fluids, jams and pastes obviously require a waterproof lining for the container; butter, cheeses, and other dairy products require a sterile container not absorbent to water or grease.

The above being a well-known state of the art with respect to packages for storage and shipment of such contents, the situation has heretofore been in part met by first making boxes or cartons of strong, stiff paper, pulpboard or pasteboard, and then providing them with a lining of parchmentized, paraffin, rosinsized or other impervious non-absorbent paper, or metal foil, or foil-coated paper, so that the package comprising the lining responds to the suggested requirements. It has also been proposed to form into a container by simultaneous folding operations a blank of such material as is suitable for the exterior of a package of this nature and an applied lining blank suitable for the interior of such a package.

But so far as I am aware it has heretofore been impossible to provide for sealing the lining, or for completely folding the lining only into an impervious or relatively impervious container, when the operation of making the receptacle as a whole involves operations upon both the lining and the body of the container. When it is desired that the lining should cover unbrokenly the inner surface of the container it has been necessary, according to the prior art price, first to make the container, then to make the lining, and then to assemble them. This is not only wasteful of time but necessitates the provision of separate receptacle-forming devices, lining-forming devices and assembling devices for putting them together. So far as I am aware, machines for automatically assembling the receptacle and the lining have not been wholly successful or economical because of the difficulty of inserting the flimsy lining into the receptacle without destroying many of the linings. Under the conditions of use, a torn or wrinkled lining prevents utility.

This invention provides automatic devices for first making an inner receptacle such as a lining for shipping or storage vessels of the kind above mentioned, for then forming about the relatively complete inner vessel a complete outer vessel, and for delivering the finished product in a closed state except for one end by which it can be filled with the material to be packaged; and the invention also provides devices for this purpose capable of performing separately any desired lesser number of these steps to make separately linings, cartons or other containers.

I shall describe the invention by reference to a particular species of machine having in it agencies for making complete a lined carton of the kind suitable for the shipment of food products, the lining being formed complete and if desired sealed along side and end closure seams, the carton being formed about the lining while the lining is still supported upon a mandrel or form, and lining and carton being subsequently removed from the mandrel and delivered ready for filling contents into the assembled lined container. The operation of the device selected for illustration is automatic, the machine working upon raw material comprising continuous lengths, sheets or blanks of material for the lining, and lengths, sheets or formed blanks of material for the receptacle, which may previously be labeled or printed, if desired, the delivered product being assembled as cartons having an impervious lining and a glued or otherwise fastened exterior open at one end, and ready for filling without any further operation upon them.

Aside from the functional aspect of the invention with respect to securing a steady and economical production of packages of the type mentioned, the invention comprises combinations of mechanism arranged to cooperate according to a new idea of relationship between the different agencies employed and useful in other aspects than for the formation of lined packaging or shipping receptacles. It will therefore be understood that when I refer to the particular function for which the particular species herein disclosed is designed, I do so by way of explanation rather than of limitation, and that my invention is of the genus expressed in the description and claims as well as of the species referred to in explanation of particular constructions.

In the accompanying drawings.—

Figures 2, 3, 4 and 5 are respective parts of a front elevation of the machine shown in Fig. 1;

Figure 6 is an elevation on a reduced scale of a part of the machine frame shown in Figs. 2-5, illustrating certain cam tracks;

Figure 7 is a front elevation on the same reduced scale as Fig. 6, of another part of the machine frame showing the relation to it of some of the moving parts;

Figure 8 is a detail plan view of that portion of the machine shown in elevation in Fig. 3;

Figure 9 is a vertical section through one of the mandrels, the traversing carrier for the mandrels, and the guides for the traversing carrier, on the line 9—9 of Fig. 2;

Figure 10 is a detail section on the line 10—10 of Fig. 9;

Figure 11 is a view in the nature of a diagram illustrating so much of a sheet as is employed for the inner container;

Figure 12 is a plan showing the relation of one of the blanks for the outer container to devices for feeding and gluing;

Figure 13 is a detail elevation partly in section on the line 13—13 of Fig. 8;

Figure 14 is a detail front elevation of the completed inner container on the mandrel and a partially complete outer container in position with respect to the mandrel and the inner container;

Fig. 21 is a diagram illustrating a modification.

It will be convenient to consider the machine as an assemblage of agencies each performing a certain part of the operations. Taking these up in order, they will now be described as follows:

I. The frame and guide tracks, the circulating mandrels or forming blocks and means for operating them;

II. The bag feeding and primary folding mechanism;

III. The secondary folding and seam-sealing mechanism;

IV. The cover feeding and auxiliary mechanisms;

V. The cover finishing mechanisms;

VI. The ejecting means;

VII. Operation.

I. The machine in the preferred form illustrated is built upon a main frame 1 preferably of cast or wrought iron having suitable bearings therein or attached thereto for the driving and subordinate shafts presently mentioned and having transverse struts 2 and longitudinal struts 2ª of suitable design rigidly to support the operating parts. Preferably the design of the machine is such as to concentrate the operated parts in the neighborhood of a circulating track oblong in form lying upon one of its longer sides, and defined by an integral or built-up casting 3, (Figs. 1 and 6) with respect to which the parts hereinafter enumerated are positioned and controlled. The frame may be extended vertically or longitudinally to provide room for any desired number of subordinate or additional agencies operating on the material. While the illustrated form, for instance, provides for one complete cycle of operations ending in delivered assembled boxes, it is within the invention to provide a frame and assembly of mechanisms adapted to accommodate means for performing two or more such complete cycles of operations, in which case there may be two or more points of delivery of the product at different parts of the frame.

Figure 1:
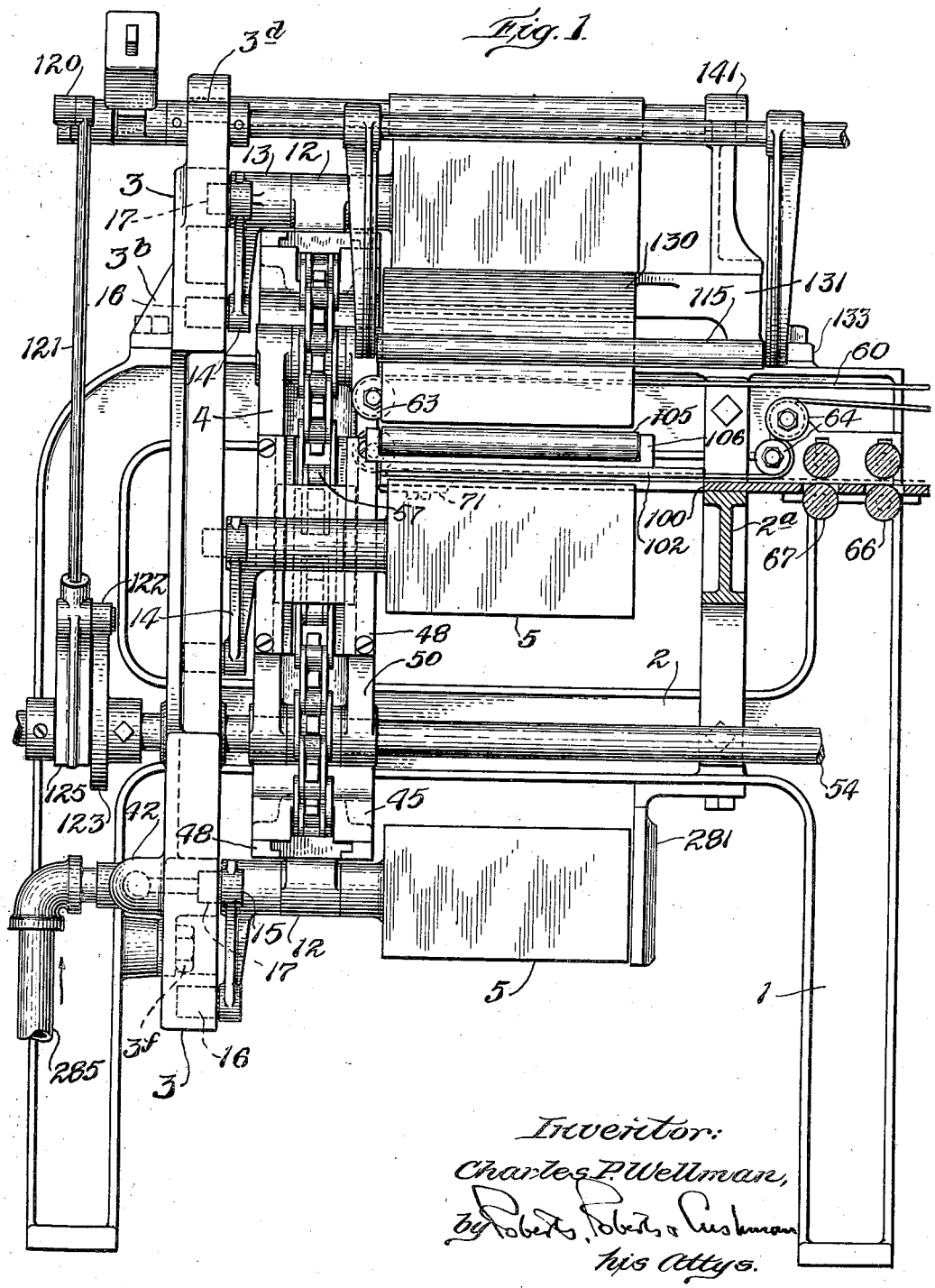
Figure 1 is a left hand elevation of a machine illustrative of my invention.
Figure 2:
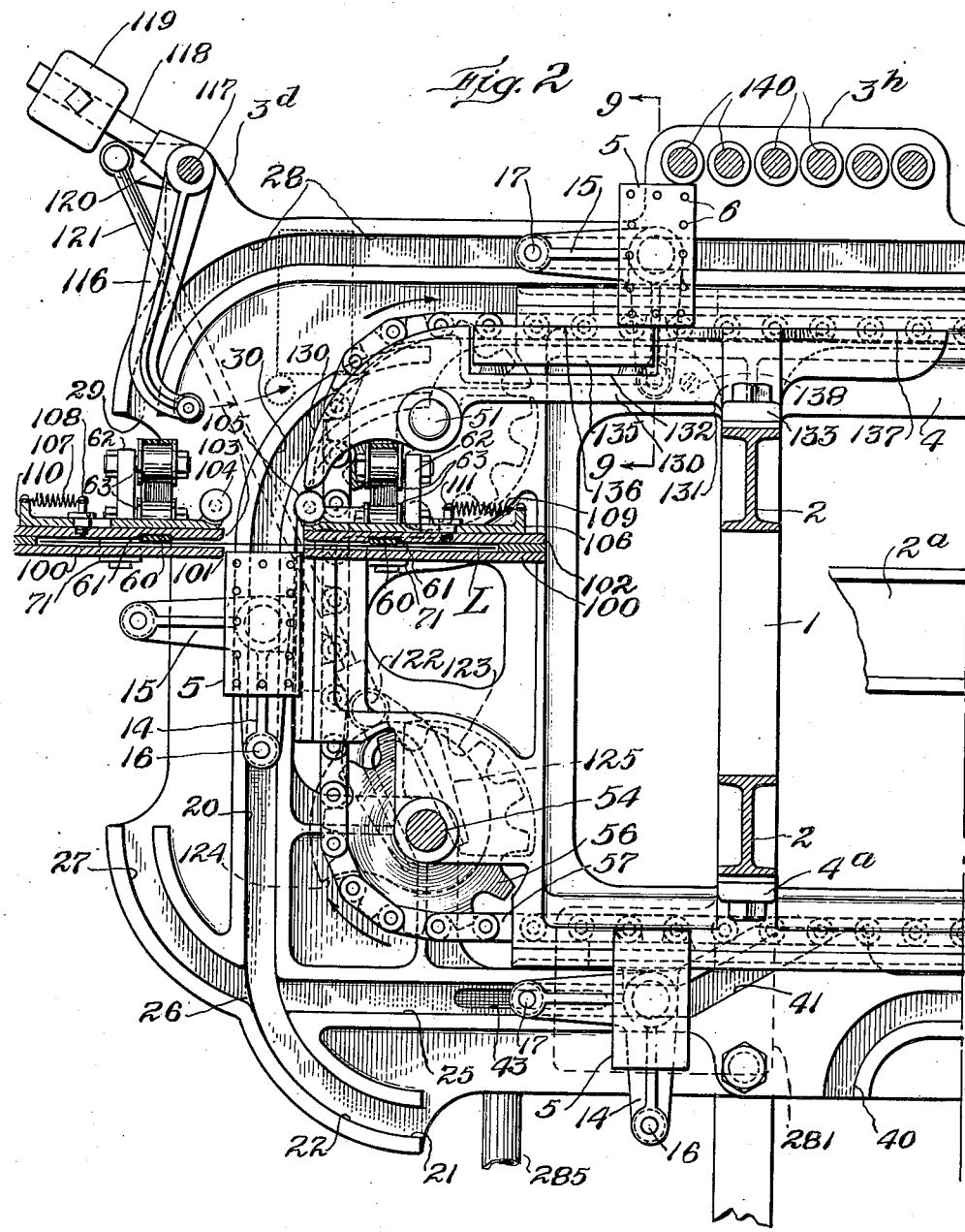

The plate 3 is associated in the machine frame with a front plate 4 best shown in Figs. 1, 2 and 7, which can be an integral or built-up casting spaced in front of and parallel with plate 3. The plate 4 is smaller than the plate 3 and its edges define a space within a path taken by certain mandrels or forms moving in a circulatory path, for instance upward at the left hand side of the machine; lengthwise to the right at the top of the machine; downwardly at the right hand side of the machine; and back to the left toward the starting point at the lower part of the machine. While in the illustrative instance figured in the drawings a particular circulatory path defined by the plates 3 and 4 and means for circulating the mandrels is shown, it will be understood that any polygonal figure, or any enclosed figure bounded by curved lines, might in some cases be adopted as the path to be taken by the circulating elements, so long as their coaction with the material and the subordinate agencies of the machine is in accordance with the present disclosure.

For the purpose of illustration the mandrels or forming blocks 5 (Figs. 1, 2 and 9) are shown as rectangular (or very slightly tapered) hollow and smooth, preferably polished, metal boxes defining the useful space in the carton, package or box to be formed. The mandrels may be of any preferred shape, such as round, or with rounded corners or ends, if desired. For a purpose presently to be described the ends of the mandrels 5 are formed with a series of perforations 6, and one of the narrower faces is provided with a longitudinal series of lateral perforations 7. The mandrel 5 is integral with or attached to a shouldered axial extension 8 providing a bearing surface 9 and having a reduced end portion 10 and a central bore 11.

The bearing portion 9 of the extension 8 of the mandrel 5 is fitted to turn within a carrier block 12, (Fig. 10) in which it is held against longitudinal movement by the shoulder at the end of the surface 9 and by the hub of a double crank 13 fast on the extension 8. The double crank 13 is provided with two arms 14, 15, at 90° from each other respectively carrying pins 16 and 17 which may, as shown, be antifriction rolls, of different lengths projecting toward the rear of the machine. The rotative position of the mandrel 5 is determined by means fixing the relative position of either pin 16 or pin 17 with respect to the center of the extension 8. Any suitable system of guides for properly orienting the mandrel 5 may be employed; but I prefer a system of fixed tracks associated with the back plate 3 which may as shown, be formed integrally thereon, and into which the respective pins or rolls 16 and 17 take and are guided.

The arrangement preferably is such as to permit the circulation about a closed path taken by the mandrel 5 without any change from the horizontal of the position of the axis 8 and to permit a change of direction of the path taken by the mandrel without changing the position with respect to the horizontal and vertical of the faces of the mandrel, but also to provide for rotating the mandrel on axis 8 when desired. For instance, referring to Figs. 2, 3, 4 and 5, in the preferred instance shown the path of the horizontal center of the mandrels is rectangular except at the corners, where the path is circular about centers within the rectangle so defined. Mandrels moving to the left on the lower run of their longitudinal path approach with the arm 15 leading and the arm 14 depending. Referring now to Figs. 2 and 6, the plate 3 is provided with a deep track 20 having an entrance at 21 for the longer pin 16 and having a curved portion 22 formed to guide the pin 16 in successsive positions of the center at the extension 8 so as to maintain the arm 15 in a vertical position. The plate 3 also carries a shallower track 25 adapted to guide the shorter pin 17 on the arm 15, this track crossing the track 20 at 26 and terminating in a curved portion 27 conforming to the path of the projection 16 of the arm 15 for the described motions of the mandrel. The track 20 continues upward to maintain the mandrel upright on its upward travel at the left hand side of its rectangular path.

The plate 3 is shown as provided at the top with a shallow track 28 having an entrance at 29 for the pin 17 of the arm 15, to cooperate with the curved portion 30 of the track 20 to maintain the mandrel in an unaltered rotative position when it swings around an upper circular corner of its rectangular path. The track 28 may extend lengthwise of the machine indefinitely, in the plane of a horizontal portion of the course of the axis 8, and be suitably deviated wherever desired to turn the axis 8 and mandrel 5 on its bearing in carrier block 12, or to permit carrier block 12 to turn about the axis 8 while maintaining the axis 8 and mandrel 5 in a fixed axial position. As shown, the carrier block 12 is so rotated at the right hand end of the machine to turn a corner of its path into a vertical descending run of the mandrels. The track 28 is therefore curved downwardly at 31 (Figs. 5 and 6) to pass through the horizontal plane of the path of travel of the center of axis 8 as determined by the path of block 12, and may end beyond its intersection with a deeper track 33 for pins 16 curved outwardly from an entrance 32, and having a vertical portion conforming to the downward vertical part of the path of the mandrels 5. It will be understood that a mandrel 5 and double crank 14, 15, circulating as described will be positioned in respect to the remainder of the machine by the travel in first one and then another of the respective fixed guiding tracks or cam grooves of the appropriate pin 16 or 17, one or the other of which is always engaged with a track.

The track 33 may curve inward at 34, and a shallow longitudinal track 35 be provided (Fig. 5) with an upwardly curved entrance at 36 to take the pin 17 before the pin 16 shall have left the track 33. The path of the mandrels is now to the left, and for a purpose presently mentioned, it is desired to turn the mandrel 5 so that its heretofore lowermost face shall lead, the adjacent faces being horizontal. Track 35 is for this purpose bent upwardly at 36, ends at 37, and an upward incline 38, (Figs. 4, 5 and 6) is provided for the entrance of the pin 16 to a horizontal tract 39, level with the track 35. All of the desired operations having been performed on the mandrel in its new position, the former positions is resumed by passage of pin 16 down curved end 40 of track 39 and entrance of pin 17 into the sloped end 41 of the track 25. The mandrel is again prevented from turning with the carrier block 12 upon beginning a second circulation upward by the tracks 22, 20, 27.

The plate 3 may have any suitable or necessary strengthening bridges as at 3$^a$, and lugs 3$^b$ for bolting to the frame members 2, as well as bearing lugs 3$^d$ for transverse shafts at appropriate places, and bores 3$^e$ for bolts 3$^f$ for its attachment to appropriate bosses on the verticals of frame 1. For purposes presently mentioned, plate 3 is also provided with a bearing plate 3$^h$, and with one or more integral hollow bosses 42 having openings 43 in one of the tracks in line with the path of the bore 11 in the mandrel axis.

The front guide plate 4 (Figs. 1, 7 and 9) is preferably a casting having straight bottom, top and end members 45 defining channels 46 (Fig. 9) and having machined faces 47 upon which flanges of the carrier blocks 12 bear and are held by the integral or attached hold-down gibs 48. Suitable flats 4$^a$ for mounting on frame members 2 and bracing bridges 4$^b$ are provided. The members 45 are discontinuous at the corners of the quadrilateral or other polygon defined by the guide-plate 4, which is recessed at 49 and provided with preferably integral bearing brackets 50 for short shafts 51, 52, and longer driving shafts 53, 54, which latter also has a bearing in lug 3$^d$ of plate 3, extends to the rear of the frame 1, Fig. 1, and is arranged to be driven by belt, gearing or electric motor (not shown).

The respective shafts 51, 52, 53, 54, are provided with sprockets 56 in line with the channels 46, and an endless chain 57 is mounted to run on these sprockets and be housed in the channels 46. Spaced bored lugs 58 of the carrier blocks 12 are linked in the chain 57 at suitable like intervals.

It will be understood that a large number of mandrels 5 may be circulated about the path of the chain 57, and that the material upon these several mandrels may be simultaneously treated, operated upon, placed, or added to or ejected at different places in the series successively reached by each mandrel, so that the several steps of the series of operations simultaneously performed in the machine are successively performed at different successive positions with respect to each mandrel. Preferably the operations are aranged to be performed on the mandrels while they are moving, and in part as a consequence of the relative motion of the mandrel past fixed auxiliary means.

These operations are facilitated by the above described means for positioning the mandrels, which are overhung in front of the plate 4 and maintained rigidly in the desired position by the sliding engagement of the carrier blocks 12 with the solid track between faces 47 and gibs 48 wherever operations are to be performed upon the material on the mandrels. The blocks 12 and the mandrels carried by them are thus supported independently of the driving means for the carriers against rotation about a lateral horizontal line or about the vertical in all the useful parts of their polygonal path, while leaving five of the six three-dimensional faces of the solid defined by the mandrels free for the action of means for applying material or working upon it while on the mandrels. The rotative position of the mandrels upon their supporting axes is accurately controlled by the rigid relation between the plate 4 and the cam-paths on plate 3, acting through the crank-arms 14, 15 and axis 8.

The preferred cycle of operations includes forming a bag which in some cases may be used separately, but which is adapted for use as the lining of a box, and is hereinafter for convenience referred to as a lining.

*II. The bag-feeding and primary folding mechanism.*

At the left hand side of the machine the empty mandrels rising in that leg of their circulatory path are each loaded with material to form a bag or container. The motion of the mandrel itself is utilized to fold the paper or other sheet from which the container is formed about the upper and lateral faces of the mandrel.

Referring to Figs. 1 and 2, the preferred arrangement comprises a preferably metallic feed table 100 slotted at 101 for the passage of the mandrels, resting on the longitudinal brace 2ª, and provided with a spaced cover 102 defining between it and the table 101 a horizontal passage open at the front of the machine for the insertion of a rectangular blank L, (Figs. 2, 11 and 15) to be formed upon the mandrel 5. The cover 102 has therein a rounded-edged slot 103 corresponding to slot 101, the edges projecting nearly to the path of the faces of the mandrel 5; and if desired, the table 100 may have associated therewith, as by mounting them above plate 102 smoothing rolls 104, 105, the outer roll 104 being mounted to rotate, for instance, in bearings on a slide 110 urged to the right, (Fig. 2) by a spring 107 against a stop 108. The inner roll 105 may be similarly urged forward by a spring 109 holding the slide 106 by which it is carried to the left (Fig. 2) against the stop 111.

The rectangular blank L may be a rectangular section cut from a strip of waxed or paraffined paper for instance, fed into the slot between the table 100 and the cover 102 by any desired means such as presently described, including means for cutting sections L from the end of the roll or strip of a predetermined sufficient length and shape to form when folded the desired lining. Referring to Fig. 11, the longer upright dimension of the blank L as there shown may be the width of the roll, the original edges being margins L', L², and the edges L³, L⁴, being transverse cuts across the roll of paper. The blank L is folded about the mandrel with the edges L', L², overlapping (see Fig. 14) in a seam or overlap of the desired width, the fold lines $f'$ and $f^2$ being as formed at the upper corners of the mandrel 5, and the fold lines $f^3$ and $f^4$ at the lower corners of the mandrel; the projecting end $f^5$ of the lining blank L including the conjoined end area $f^6$ is then folded inward on the line of intersection of the front face of the mandrel with its narrower top and bottom faces. The end side flaps $f^7$ and $f^8$ are then folded in on the end of the mandrel in an order presently mentioned. The primary fold on the lines $f^1$, $f^2$, is occasioned by the motion of the mandrel 5 upward through the slot in the cover 102, the rounded edges 103 and rolls 104, 105 causing the blank L now being withdrawn from its position on the table 100 to lie smoothly down the vertical faces of the mandrel, so that, as the mandrel passes through the plane of the table 100 the blank L is formed about its upper face and bent smoothly at the fold lines $f^1$ $f^2$. It will be understood that the same operations are available, whatever the exact form of the mandrel, to load a blank upon it and perform the primary folding of the blank.

Figure 15:
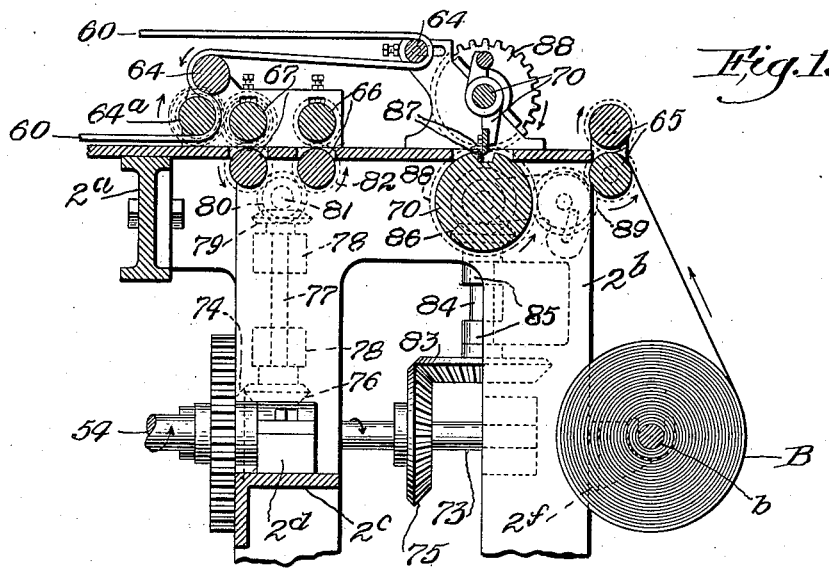
Figure 15 is an end detail elevation of the lining feeding and severing mechanism.

The blanks L may be separately cut and inserted by hand in the proper position on the table 100 but it is preferred to supply the blanks by automatic strip-feeding and severing mechanism of which a preferred form, illustrated in Figs. 1, 2 and 15, is adapted to deliver a severed blank in proper position at the table 100 before the passage up through the table of each mandrel.

A preferred feeding and severing mechanism for the blanks L comprises friction tapes 60 in channels 61 on the under face of the feed table cover 102 (Figs. 1 and 2), running on pulleys 63 on stands 62 on cover 102, and on pulleys 64 (Figs. 1 and 15) of which one may be driven, and one be adjustable to tighten the tapes 60.

The table 100 is extended to the right of the machine on a frame 2ᵇ, preferably bolted to the longitudinal 2ª, frame 2ᵇ having a strut 2ᶜ on which a bearing 2ᵈ is provided for the end of the shaft 54, Figs. 1 and 15.

Shaft 54, which preferably makes substantially one revolution between each passage at table 100 of a mandrel 5, may be relied upon to drive and time the devices for cutting off and intermittently feeding forward the bag-making blanks L, preferably from material in a roll B, Fig. 15, rotatable on an axle $b$ in bracket bearings 2ᵗ at the front of the frame 2ᵇ.

Any desired cutting off and feeding means for the blanks L cut from the material B may be employed. As shown, a constantly driven pair of geared tractor rolls 65, 65, in suitable bearings draw off the material B at the forward edge of the table 100, and advance it between cutter rolls toward the grip of rolls 66, 66, and 67, 67, driven by connecting gearing at a higher rate, which rolls in turn deliver the blank cut off at 70 to the tapes 60, by which the blank is delivered against adjustable stops 71 at the rear of table 100.

Figure 17:
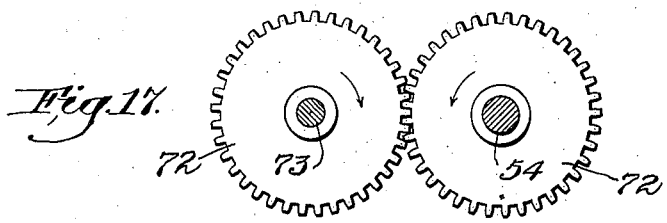
Figure 17 is a detail left side elevation of parts of Fig. 15.

These devices may be driven from shaft 54 by any desired means timing the delivery of the successive blanks L in the path of the rising mandrel 5. For instance, see Figs. 15 and 17, the shaft 54 may have fast thereon the driving member of gearing 72 moving a driven member fast on a shaft 73 in bearings on frame 2$^b$ and carrying bevel gears 74 and 75. Gear 74 drives at an increased speed, a pinion 76 on a vertical shaft 77 in bearings 78 on the frame, and a pinion 79 meshing with a gear 80 on a shaft 81 having thereon one member of gearing 82 driving in common the rolls 66, 66, and 67, 67. The driven pulley 64$^a$ for tapes 60 may be geared to one of the rolls 69, as shown. Gear 75 drives at an increased rate a gear 83 on the lower end of a shaft 84 in bearings 85 directly geared at 86 to one of the cutter rolls 70 which, as shown, may be of the type comprising shear-blades 87 arranged to shear the material B at each full revolution of the rolls 70, which are geared together at 88 to cause their blades 87 to shear-cut the strip between them. A changeable idler gear 89 between one of the gears 88 and one of the tractor rolls 65 drives the latter at a rate so related to that of the rolls 66 and 67 and cutter rolls 70 as to deliver a proper length of material for one blank L during each revolution of rolls 70.

It will be noticed that the tapes 60, the rolls 65, and the remainder of the feeding means run at a speed delivering the cut blank to the table 100 in about half a revolution of shaft 54. These deliveries coincide with the approach to table 100 of an empty mandrel 5, and result in delivering a blank L in time to be folded on the mandrel as mentioned above.

It will be observed that the relatively flimsy lining blank is fed to the machine above the advancing mandrel so that gravity aids in positioning and holding it in relation to the advancing mandrel.

Referring now to Figs. 1 and 2, mechanism is provided for tucking the section $f^9$ of the blank L under the section $f^{10}$ when folded at the fold lines $f^4$ and $f^3$ respectively. One preferred form of mechanism is illustrated comprising a following roller 115 journaled in depending arms 116 fast on a rock shaft 117 having bearings in a lug 3$^d$ of the plate 3 and in a bearing bracket at the front of the machine (not shown). The shaft 117 is normally rocked to urge the roll 115 to the right of Fig. 2 by a gravity arm 118 carrying an adjustable weight 119, and this motion is opposed by a crank arm 120 on the shaft 117 and a link 121 ending in a fork 125 straddling the shaft 54, and provided with an antifriction roll 122 bearing on the periphery of a cam 123 fast on the shaft 54. The cam 123 preferably has the figure best shown in Fig. 2 comprising a radial or sudden inward incline 124 adapted to permit the weight 119 to force the roll 115 forward to and beyond the dotted line position shown in Fig. 2 in time with the passage to the dotted line position of the mandrel 5, the relation of the center shaft 117 to the roller 115 being such as to cause the arc followed by roll 115 to coincide with successive positions of the bottom face of the moving mandrel, roll 115 overtaking the mandrel and so tucking in the portion $f^9$ of the blank L. The leading depending flap $f^{10}$ of the blank L meanwhile meets the smooth surface of a guide preferably formed as the depending curved face of an integral casting 130 also including a projecting bridge 131 and having a recess at 132 fore and aft of the machine, and having a leg 133 adapted to be bolted to the frame member 2 forward of the plate 4, and if desired, means 138 for attachment to plate 4.

If the bag formed of the blank L is to be fastened by glued seams, provision for pasting or gluing an area, edge or edges of the blank before or after it leaves the table 100 may be made, but in the illustrative machine shown the intended product comprises a paper either impregnated with a fusible substance or having an area of fusible cement already applied on the surface of the section $f^9$ or other appropriate part of the blank as viewed in Fig. 11. Sealing of the longitudinal seam formed along the bottom face of the mandrel by the overlapping of the section $f^{10}$ over the section $f^9$ can in this case be effected by the application of heat and pressure; and I have illustrated preferred means for such application in Fig. 2, comprising an electrically or otherwise heated plate 136, preferably part of an electrical heater unit 145 mounted in the recess 132 of the plate 130. Instead of the electrical heater unit 135, gas or steam heating means for a plate having an upper surface in substantially the same position as the upper surface 136 of the unit 135 may of course be employed. This surface 136 is flush with the upper level surface 137 of the guide plate 130 which is continued to the right as shown in Fig. 2 to a point well beneath the position of the bearing lug 3$^h$ on the frame 3. In operation, the overlap formed between sections $f^9$ and $f^{10}$ of the blank is heated to the fusing point of its fusible coating or impregnation at passage of the surface 136, and preferably I now subject the softened or fused waxed, paraffined or cemented overlap to pressure while it cools and sets. Preferred means for subjecting the longitudinal seams so formed to pressure comprises rubber-covered pressure rolls 140 having a bearing at one end in the bearing lug 3$^h$ and at the other end in a bracket 141, Fig. 1, carried by the bridge portion 131 of the plate 130. By the time the mandrel passes away from the surface 137 the longitudinal seam is cooled and set under pressure. Rolls 140 may if desired be driven by appropriate means.

III. *The secondary folding and seam-sealing mechanism.*

Figure 3:
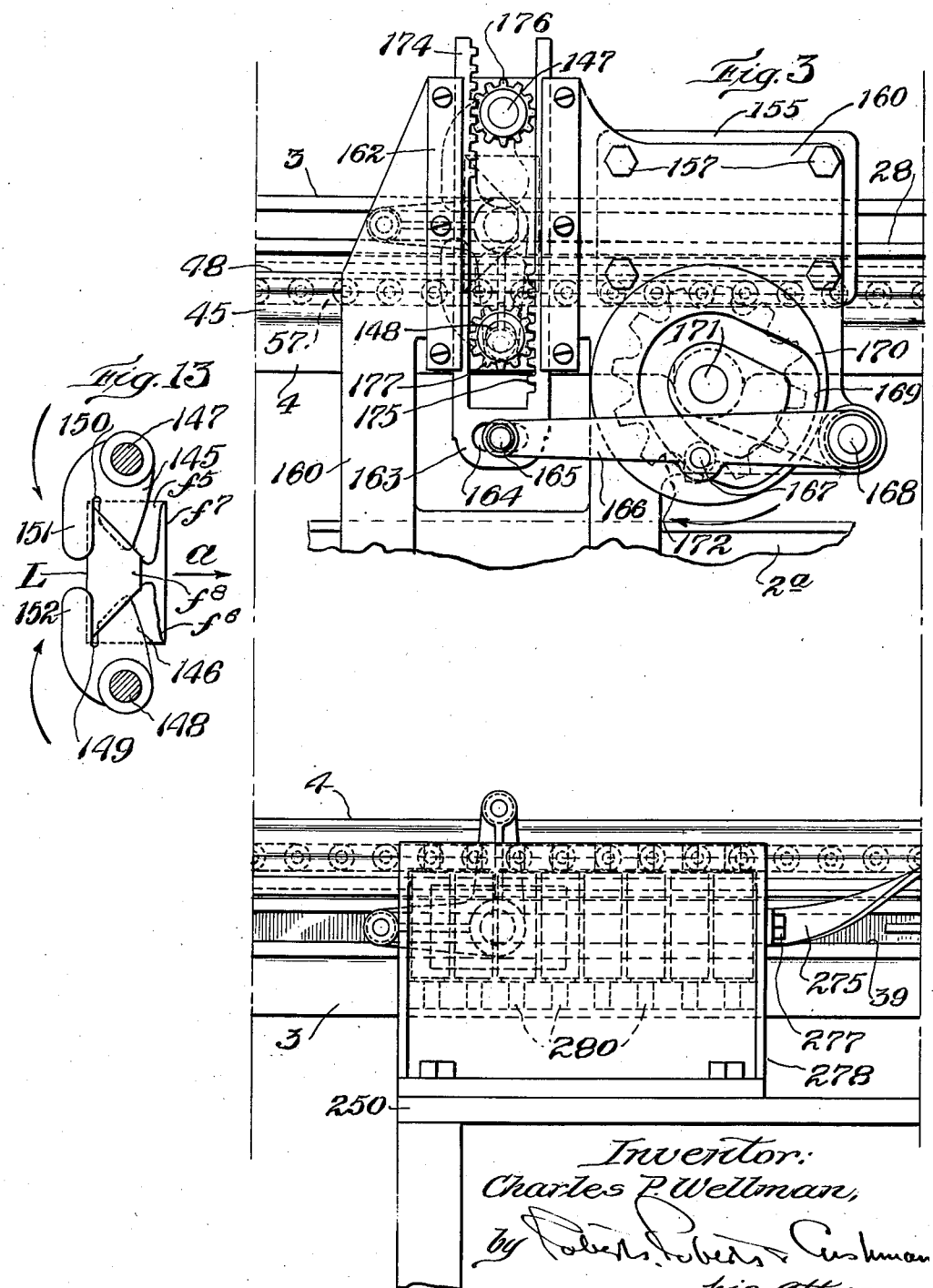

The described agencies have now formed upon the mandrel 5 a tube of the lining blank L having a sealed longitudinal seam. Preferably the bottom end of this tube is now folded and sealed first from the shorter sides of the mandrel and then from the longer sides of the mandrel to form the bottom folds best shown in Figs. 4 and 14. One preferred agency for this purpose is illustrated in Figs. 3, 8 and 13. The mandrel bearing the longitudinally seamed and sealed tube of the fabric L moving to the right is arranged to encounter top and bottom folding wings 145, 146, respectively arranged to rock on fore-and-aft rock-shafts 147, 148, and so timed that the wings 145, 146 respectively move downwardly and upwardly against the projecting blank sections $f^5$ and $f^6$ at such a rate as to carry them into the position illustrated in Fig. 13 when the mandrel moving in the direction of the arrow $a$ is central between the respective shafts 147 and 148. Integral with wings 145, 146 but separated from them by the rounded-edged slots 149, 150, the side-flap folding wings 151, 152, now overtake the flap $f^8$ and lay it firmly against the flaps $f^5$, $f^6$, already folded against the end faces of the mandrel by the operating wings 145 and 146. The oscillatory beat of the wings 142 is sufficient to follow the flap $f^8$ beyond the positions indicated in Figs. 8 and 13, to hold said flap in its folded position until the flap $f^7$ (Fig. 8) can be laid down upon the end of the mandrel. This is accomplished by the mandrel running against the beveled end 154 of heater unit 155, preferably electrically heated, which may be mounted on springs 156 and adjustable by limit screws 157 (Fig. 3) in a frame bracket 160, on which the bottom folding mechanism is hung. Bracket 160 is preferably erected on one of the longitudinals 2ª, and comprises a member formed with a vertical channel 161 having overhanging gibs 162. In the channel 161 U-slide 163 slotted at 164 for a pin 165 is adapted to be vertically reciprocated by a radius arm 166 carrying pin 165 and having an anti-friction roll 167 pivoted to the bracket 160 at 168. Roll 167 takes into the groove 169 of a path-cam 170 fast on a transverse shaft 171 having an attached sprocket 172 in a recess in the frame 4, communicating with the channel 46, sprocket wheel 172 taking into and being driven by the chain 57. The slide 163 carries racks 174 and 175 respectively engaging pinions 176 on the shaft 147 and 177 on the shaft 148.

The flap $f^7$ is folded down on the flap $f^8$ by the beveled surface 154 of the heater 155, and the fusible coating or impregnation of the bottom folds is softened or melted and the bottom folds stuck together and sealed. If desired, the heater 155 may be followed by a cooling and pressure plate 180 (Fig. 8) suitably mounted on springs 181 on a bracket 182 mounted like the bracket 160.

The above described succession of operations has produced by wrapping or lapping about the mandrel a blank, a tubular longitudinally-seamed bag having a square folded bottom sealed together and impervious to moisture, provided the material in the blank L was an impregnated or coated material suitable for these purposes. But it will be understood that the blank L might well be an impervious, uncoated and unimpregnated material, and that any known or desired mechanism might be furnished to replace the heaters 135 and 155 in order to seal the bags by pasting, gluing or in some other way than by fusing a fusible coating or impregnation of the material of the blank L.

It will also be observed that the bag or lining formed of the blank L is now a relatively complete and useful article of manufacture, which may constitute the sole product of the machine. I may therefore arrange to remove the bags or containers so formed from the machine, and arrange the machine to repeat the described steps with the aid of a mere duplication of the feeding and described auxiliary apparatus to make a further series of bags before the mandrels again encounter the feed table 100 and receive fresh supply of blanks for the linings L. For instance as shown in Fig. 21, the table 100 and its blank-feeding means may be repeated at the downcoming end of the path taken by the mandrels at the right hand end of the machine, and a duplication of the automatic means comprising the aperture 43 presently described for ejecting the formed bags may be arranged on the upper run of the path of travel of the mandrels 5 following their passage of the heater 155. But I prefer the illustrated arrangement of the machine, in which a subsequent step in the cycle includes making a box around the bag while the bag is still supported by the mandrel.

IV. *Cover feeding and auxiliary mechanisms.*

Figure 16:
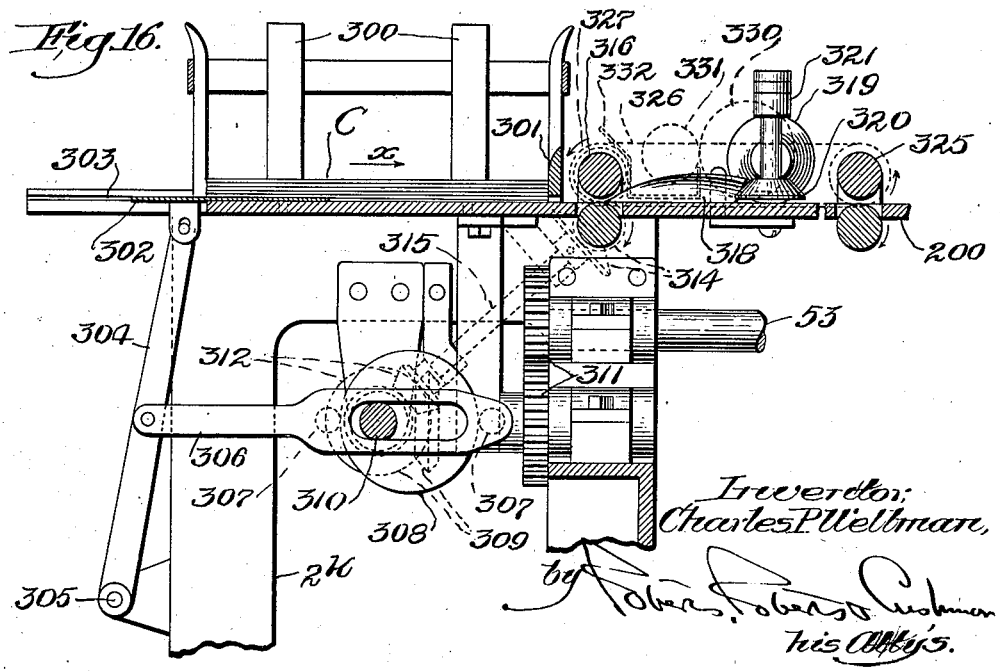
Figure 16 is a detail elevation from the right end of the machine showing the cover blank feeding mechanism.

Referring now to Figs. 5 and 16, a preferred arrangement at the right hand end of the machine comprises a feed table 200 having a rounded edged slot 201 therein for the passage of the mandrels 5 still bearing their relatively completed and sealed lining bags, the mandrel and lining passing downward through the slot 201 with its seamed side leading. Before the passage of each mandrel a blank C to form the exterior of a carton or box is placed on the table 200, and by the motions of the mandrel is folded about the mandrel from its flat state as illustrated in Figs. 12 and 14. Preferably the blank C is of the type best shown in Fig. 12, comprising the longitudinal edge scores $c'$, $c^2$, $c^3$, $c^4$, and the lateral edge scores $c^5$ and $c^6$, these score marks defining a front $c^7$, a back $c^8$, a side $c^9$ and a side $c^{10}$. Continuous with the front $c^7$ a sealing seam flap $c^{11}$ preferably is provided. The end flaps $c^{12}$, $c^{13}$, $c^{14}$, $c^{15}$, are preferably separated by cuts $c^{21}$, and the other end flaps by cuts $c^{22}$ respectively continuing the corner scores $c'$, $c^2$, $c^3$, $c^4$, but any preferred or desired arrangement of end-closures may be provided for. In some cases the box may have no closure at one end, for instance ending in line $c^5$.

For instance, the blank may be arranged to be integrally folded in square or envelope folds at the bottom as described in connection with lining L, but preferably the bottom is divided into a front flap $c^{12}$, a back flap $c^{13}$, and side flaps $c^{14}$ and $c^{15}$.

As in the case of the lining it is preferred to form the primary folds $c^2$, $c^3$, by the proper motion of the mandrel in respect to the table upon which the waiting blank is placed, and by lapping or wrapping the blank about the mandrel. By this arrangement the blank if of some classes of material, need not be scored, or if scored, may never have been bent at the position of the scored lines, and particularly may not, as in the prior art, have been bent through 180° preparatory to lining and filling. Easily broken stock is worked with a success impossible if the steps of manufacture require sharp bending.

The table C is provided with guides 202, 203, to align the folding lines $c^2$, $c^3$ of the blank C with the edges of the descending mandrel 5 and the lining L, and upon the passage of the lower face of the mandrel and lining through the slot 201 of the table 200 the relatively stiff blank C bends upwardly about the right and left faces of the mandrel and the lining upon it. The cover C is firmly seated and smoothed upon the mandrel by smooth curved guides 204 and 206 extending vertically at the left and right of the path of the mandrel and substantially following the path of the mandrel 5 around the corner of its path of travel and until it is moving horizontally under the influence of the track 35. Any part of the path of the mandrel may be arranged to lie between rolls such as the rolls 104, 105 above explained, for supplementing the effect of, or replacing, the edges of the slot 201 in the table 200. The guide 206 is preferably formed as a casting having a hollow extension 207 in which a number of pressure rolls 208 are journaled.

The casting 206, 207, is bolted at 209 to one of the frame members 2 and may be positioned at the right hand end by taking over the shaft 56, or be otherwise suitably held in place.

To the left of the end of the guide 204 a lower series of pressure rolls 205 opposing the rolls 208 is mounted in any suitable form of bearing as at 210. Preferably the rolls 208 and 205 are rubber covered; their distance apart is sufficient to take the longer vertical dimension of the box, lining and mandrel.

In order to fold the longitudinal joint in the cover C between the flap $c^{11}$ on the face $c^7$, and the side $c^{10}$ a follower roller 212 is arranged to enter an opening 213 in the guard 204 and turn the side $c^{10}$ over on the flap $c^{11}$, the flap $c^{10}$ having been glued as will presently be explained, and the flap $c^{11}$ having been bent at the score mark $c'$ to ensure passage inside of the flap $c^{10}$. Preferably the roll 212 is journaled in arms 214 on rockshaft 215 having one bearing in a lug $3^d$ of the frame 3, and another bearing on the forward part of the machine, (not shown) the shaft 215 having an adjustably weighted arm 216 and a crank arm 217 connected by link 218, fork 219, taking over shaft 56, and antifriction roll 220, to move as permitted by the surface of a cam 221 fast on the shaft 56. Cam 221 is designed to give a sudden inward movement of the roll 212 immediately after the top of the mandrel 5 has passed the arc of its motion central at shaft 215.

Flap $c^{10}$ is kept in place by the sliding and rolling contact of the top of the mandrel and its wrappings with the polished face of the curved plate 206 and the glued seam formed at the leading upper corner of the wrappings on the mandrel is pressed and rendered firm by the operation of the pressure rolls 208, 205, as the carrier passes off to the left of Fig. 5. While it is generally unnecessary to drive the rolls 208 except as they are rotated by the box passing under them, driving means of any desired kind adapted to rotate them at the same or a higher peripheral speed than the rate of travel of the box C may be provided, and when provided avoid any tendency of flimsy material to buckle at the side $c^{10}$.

The cover or box blanks C may be fed by hand on to the table 200, but it is preferred automatically to feed preformed blanks from a stack of blanks previously cut, for instance to the type of outline best shown in Fig. 12, slit at $c^{21}$, $c^{22}$, and scored longitudinally at $c^5$, $c^6$, and transversely at $c'$, $c^2$, $c^3$, $c^4$. Such blanks may be printed or decorated on their lower (outer) faces, and need never have been bent at their score marks prior to use by the machine, and are not therein bent through angles much greater than a right angle to the original plane of the sheet of cardboard or other material. Provision to avoid bending the blanks during manufacture greatly increases the strength of the finished box at its corner; it is a frequent experience in the prior art to so weaken the blanks for boxes by bending through 180° or repeated bending during partial forming as to make it impossible to use paper stock or other sheet material otherwise suitable. The present machine makes a strong carton or box out of material impractical to handle without breakage by the manipulations of the prior art.

The table 200 is extended to the left, Fig. 16 toward the front of the machine on a supplementary frame $2^k$ bolted to the frame members 2, and having thereon a gravity hopper frame 300 for the blanks C. The blanks are placed in this hopper with their principal slits and scores in line with the direction $x$, Figs. 12 and 16, in which the blanks are fed to the machine. Hopper 300 has a gate 301 of proper height to pass out the bottommost blank in direction $x$, and such motion is facilitated by the alignment of the cuts in the blank with the direction of motion, so that interlocking of the cut flaps in the stack of blanks is prevented. Preferred means for feeding a blank into range of the mandrel 5 prior to the passage of each of them past table 200 comprises a reciprocating pusher 302 working in guides 303 at the edges of an opening provided for it in table 200, the pusher, being worked by an arm 304 pivoted at 305 on frame $2^k$ and actuated by means moving in time with the passage of the mandrels. Preferably the arm 304 is pivoted to link 306 having rolls 307 following the surface of an eccentric 308 on shaft 310 rotated by bevel gearing 309 and spur gearing 311 from shaft 53, (see also Fig. 5) driven from the mandrel circulating means. Shaft 310 is in suitable bearings on frame $2^k$, and carries at one end a pinion of bevel gearing 312 having a member on an inclined shaft 315 in bearings 314 having at its other end a member of bevel gearing 314 adapted to drive one member of the geared tractor rolls 316 situated transversely of table 200 and immediately in front of gate 301 of hopper 300, and adapted to receive a blank C started forward by pusher 302. The upper roll 316 is reduced in diameter at that end next the flap $c^{11}$ of the blank C, to permit the flap $c^{11}$ to be turned up by a plow 318 delivering the flap $c^{11}$ to toothless beveled rolls 319, 320 hung on a bracket 321 so that roll 320 is above the upper surface of the blank C moving on table 200. Rolls 319, 320 turn flap $c^{11}$ upwardly at a little more than a right angle, smooth the fold begun by plow 318, and leave the flap $c^{11}$ permanently bent into the position relative to the remainder of the blank shown in Figs. 5 and 14. The effect of this is to insure the passage of flap $c^{10}$ outside of flap $c^{11}$ as described above.

The blank C may be forwarded from the delivery of rolls 316 by any desired means. As shown, as many pairs of rolls 325 as necessary are driven by any convenient means, as by belts 326 from a pulley 327 on the axis of one of the rolls 316, in unison with the rolls 316.

The upper (inside) face of blank C is glued along the edge region $c^{23}$ of flap $c^{10}$ by any convenient means during its progress in direction $x$. As indicated in Figs. 12 and 16, a glue roll 330 may be mounted to be independently driven, or driven by contact with the blank, and thus to receive glue from primary roll 331 in a glue pot 332 above the path of blank C.

Delivery of the blanks C from the rolls 325 takes place between the guides 202, 203, Fig. 5, during the intervals between passages of table 200 of the mandrels 5. Since the rolls 316, 325 are continuously driven, the time of arrival of the blank C depends on actuation of pusher 302, which is controlled by the motion of the chain 57 acting through the shaft 53 and cam 308.

Figure 18:
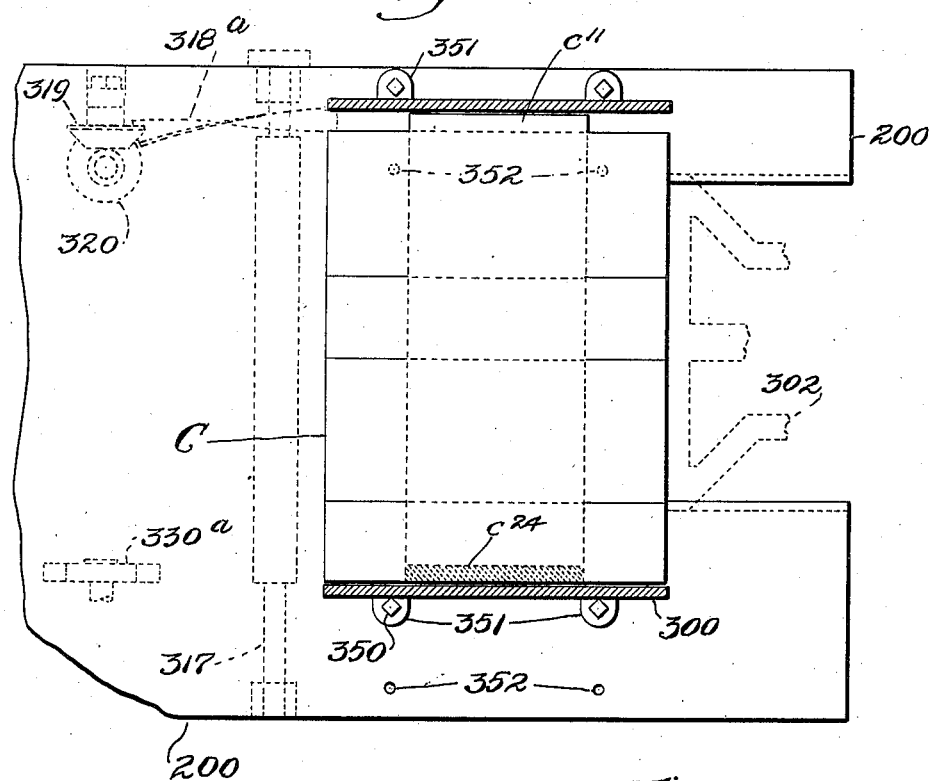
Figure 18 is a detail plan view of the box blank feeding mechanism.
Figure 20:
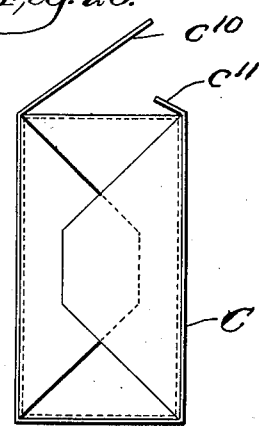
Figure 20 is an end elevation of one form of the product of the machine prior to closing the longitudinal seam of the cover of the receptacle.

It is often desirable to make the same kind of box or carton from blanks reversed in relation to the position of their glue-laps or other closure flaps, in order to economize in the sheets and boards from which the blanks are cut. For instance, as illustrated in Fig. 18, it may be desired to feed the blank C with the glue-lap $c^{11}$ to the right, as shown in Fig. 18, instead of to the left, as shown in Fig. 12. This invention provides for readily shifting from one to the other of these ways of effecting the fold; that is, from folding the cover C in the way shown in Fig. 14, to folding it in the way shown in Fig. 20.

In order to make this change, the space $c^9$ of the blank C is fed in the same line, and if the blank is not symmetrical about the space, it is then necessary to shift the hopper space 300 on the table 200. Preferably the hopper is fastened down by screws 350 in lugs 351 arranged to take into holes 352 in table 200, in series at the right different positions. The plow 318 may be replaced by a plow $318^a$ turned in the opposite sense, which may be employed with the toothless beveled rolls 319, 320, by shifting their bracket 321 to the opposite side of the table from the position shown in Fig. 12, to the position shown in Fig. 18. A similar change is made in the gluing device (from one side of table 200 to the other).

Figure 19:
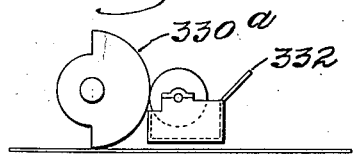
Figure 19 is a detail elevation of flap gluing means of a preferred form.

Instead of using a disc or roll of unbroken periphery to apply the glue to the region $c^{23}$ of the blank, a roll with a segmental face $330^a$, Fig. 19, may be employed to glue the area $c^{24}$, Fig. 18, only. In case the roll 330ᵃ is in use, the lining bag is not glued to the cover.

V. *The cover finishing mechanism.*

Figure 4:
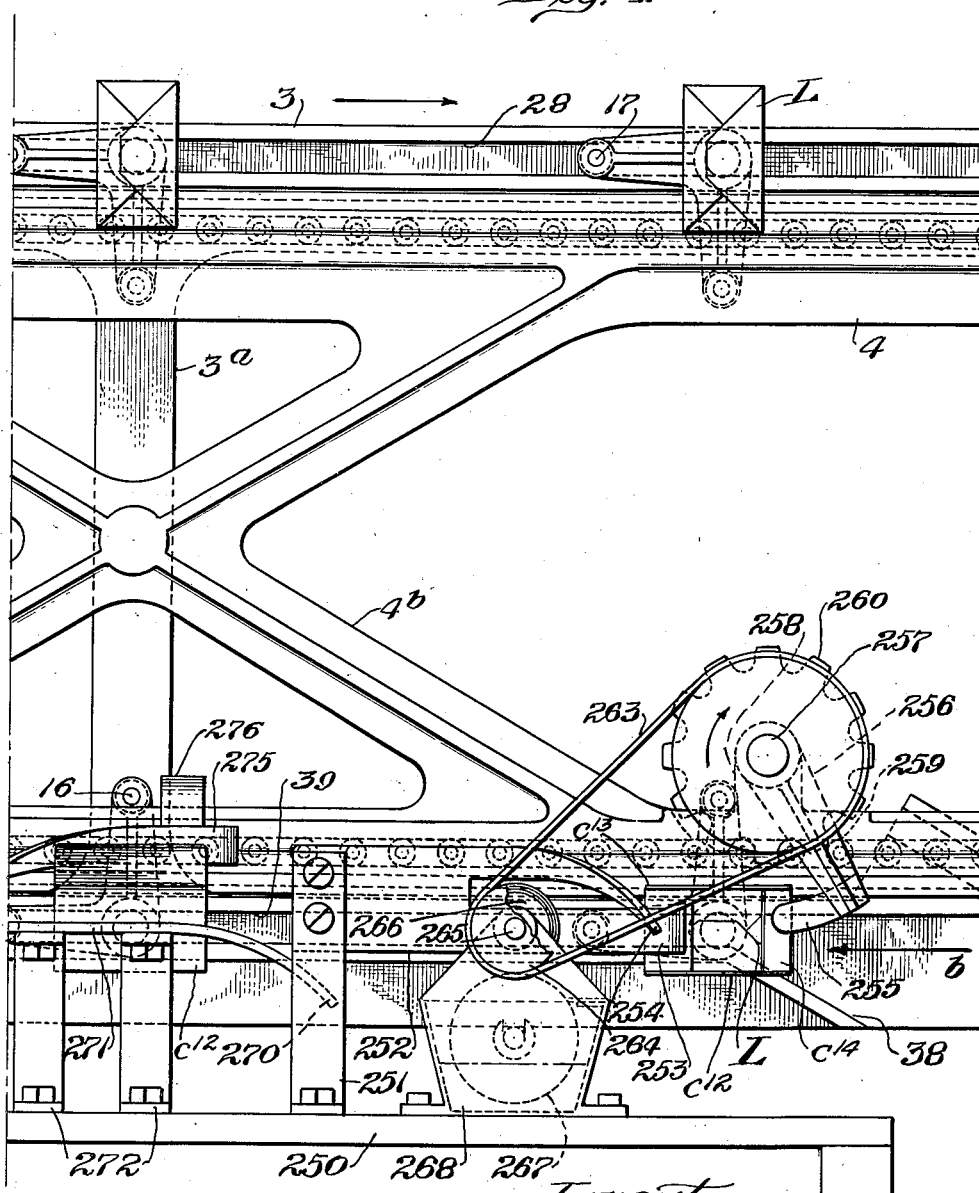

The bottom of the cover box is next closed and sealed. Referring to Figs. 3 and 4 for preferred means, the loaded mandrel approaching in the direction of the arrow $b$ is turned by the action of the slopes 36 and 38 upon the pins 17 and 16, so as to cause the heretofore lower side of the mandrel and carton to lead. In front of the path of the mandrel there is erected upon the floor (and if desired, bolted to the machine frame 1) a supplemental bench frame 250 upon which is erected a bracket 251 carrying a plow plate 252 comprising a forwardly curved member 253 adapted to encounter the flap $c^{14}$ folded in against the end face of the mandrel.

The plow plate 252 also carries spaced in front of and above the curved member 253 an upwardly and inwardly curved member 254 adapted to engage the flap $c^{13}$ of the carton or box and lift it upwardly free of the path of a swinging flap folder 255, preferably made as shown, as a curved blade mounted on the end of a rotating arm 256 on shaft 257 in a bearing 258, Figs. 4 and 7, on plate 4. Beyond the bearing 258 in a circular recess 259 communicating with the channel 46, a sprocket wheel 260 fast on the shaft 257 engages and is driven by the chain 47.

The folder blade 255 overtakes the mandrel advancing in the direction of arrow $b$ and lays the flap $c^{14}$ of the carton cover against the end face of the lining and mandrel. A flap $c^{14}$ so laid down enters under the plow 214 and plow plate 252 by the proper motion of the mandrel before the motion of the swinging plate 255 takes it past the end of the mandrel. The upper flap $c^{13}$ has been opened upward by the plow 254 cut of the way of the plate 255 before the plate 255 passes upwardly through the level of the now upper face of the mandrel. The shaft 257 carries at its forward end a pulley 262 for a belt 263 driving a pulley 264 on a shaft 265 carrying a glue applicator roll 266 cooperating with a glue roll 267 in a glue bath 268 bolted to the frame 250. The engagement between roll 266 and roll 267 is in the plane of the forwardly projecting flap $c^{12}$ of the carton and passage between the roll 267 and the roll 266 glues the upper and lower faces of the flap 12.

As the mandrel 5 and applied coverings pass toward the left of Fig. 4, the forward end of the flap $c^{12}$ inside of the glued surface encounters the depending curved end 270 of a laterally thin guide plate 271 on brackets 272 which lifts the glued flap $c^{12}$ up against the flaps $c^{14}$, $c^{15}$, preparatory to closing the exterior flap $c^{13}$ upon them. Flap $c^{13}$ is folded forwardly downwardly, and against the now closed flap $c^{12}$ by a guide 275 curved through 180° from its upper right hand end shown in Fig. 4, to its lower left hand end, shown in Fig. 3. The guide 275 preferably is hung by a curved bracket 276 from plate 4 at its entrance end, and at its exit or finish end is bolted at 277 to a casting 278 in turn fast on the bench 250. The casting 278 is provided with a series of vertical pressure rolls 280 adapted to bear against the front face of the mandrel and so to complete by pressure the gluing of the bottom flaps of the now relatively complete receptacle. When the flap $c^{12}$ is glued at the device 266, 267, bottom of Fig. 4, a line or lines of glue is formed on both faces of the flap $c^{12}$ of the bottom. This serves not only to provide adhesive to stick the flap $c^{12}$ to the inturned end flaps $c^{14}$, $c^{15}$, and to stick the last-inturned or outer side flap $c^{13}$ to the exterior face of the flap $c^{12}$, but also serves to provide an internally exposed narrow glued surface to stick the lining bag at its bottom to the inside of the flap $c^{12}$ of the cover box at the flaps $c^{14}$, $c^{15}$, when pressure is applied at rolls 280. The rolls 280 may be of any type familiar in the art, for instance having rubber surfaces, or having a spring mounting to press them rearwardly against the face of the mandrel 5.

VI. *The ejecting means.*

As mentioned above the mandrel bearing the now relatively complete lined receptacle is again turned to its original position after the bottom is formed, in which position the preferably fused seam of the lining is on the under side of the mandrel and the glued longitudinal seam of the cover is on the upper side of the mandrel as the mandrel approaches its starting point, see Fig. 2. After the curved track section 40 and the sloped section 41 have so positioned the mandrel, the finished bottom of the receptacle runs behind the guard plate 281, Figs. 1 and 2, preferably hung as best shown in Fig. 1 from the under side of a nearby frame member 2. While the traveling mandrel is adjacent to the guard 281 the inner end of the bore 11 of the traveling mandrel comes opposite the aperture 43 in the bottom of the track 25. This aperture 43 communicates with a hollow boss 42 at the back of the plate 3, which in turn has tapped into it the exit end of a pipe 285 in which an air-blast is maintained, as from a blower or pump, not shown. The effect of this is to raise the pressure within the hollow mandrel 5, and to place the interior of the receptacle on the mandrel under pressure through the openings 6 in the end face of the mandrel and through the row of openings 7 in the bottom face of the mandrel. So long as the mandrel is opposite to guard plate 281, this air pressure is exerted laterally of the passage through the holes 7 and serves effectively to break any attachment to the surface of the mandrel of the lining which may have occurred during the setting of the seam by the heater 135 or other means used to close the longitudinal seam in the lining L. Without this preliminary stripping from the mandrel, the next step of ejecting a completed receptacle from the machine could not be performed with uniform success.

As the now loosened and finished package by the proper motion of the mandrel 5 passes beyond the guard 281 the air blast pressure through the holes 6 blows the completed package from the mandrel toward the observer in Fig. 2, and if desired the package may be then received by a conveyor, basket or chute, not shown. The mandrels 5 immediately pass upward to receive a new lining to begin the operation over again.

VII. Operation.

It will be observed that the mandrels 5 and their carriers, the plate 4 and the plate 3 define upright parallel planes, and that like points on the mandrels 5 describe paths following the chain 57, which paths are curves also parallel to said planes, the curves traced by any two of these points themselves being parallel in every dimension, except in the segment at the bottom of the circulatory path, where the mandrels are turned to be acted upon by the instruments 255, 254, 270, 275, 280. The described devices are thus enabled to perform all of the operations to be performed upon blanks carried by the mandrels as the result of motions of ancillary parts in directions also parallel with these parallel planes, any point for instance, on the effective parts of follower 115, the end folders 145, 151, 146, 152, the follower 212, and the bottom flap closer 255 being held to move in an upright plane parallel with the plane of motion of the mandrels. Wherever possible, the appropriate folding or pressing action is performed by static means against which the moving mandrel and its receptacle reacts by virtue of the line of travel of the mandrel and the material upon it. A valuable consequence of these provisions lies in the relative simplicity of and accessibility of all parts, all motions being taken from short transverse shafts and the carrier chain. The blank-feeding devices at the ends of the machine are the only devices which have motions in a lateral sense, in the preferred form shown. As a result of those provisions, the machine takes little floor-space in its lateral dimension; an operator standing at its right as viewed in Fig. 1 is in convenient reach of the material-supply, of the heaters and paste or glue pots, of the ejection point, and of all of the operative parts, the whole operation being visible and accessible from this point.

A more valuable consequence of the described relation of parts lies in capacity for speed and efficient utilization of power, the machine being able to perform all of the operations on the traveling materials and mandrels without cessation or variation of the motion of the mandrels, or other heavy parts.

The operation of the mechanism as a whole will now be evident. It is obvious that a circulating series of mandrels 5 of indefinite number depending upon the mere length of the machine and operating at a relatively high speed of traverse through the machine may continuously assist, at the various agencies pointed out above, in the respective steps of the manufacture of a stream of relatively complete lined boxes or cartons delivered from the machine at the end of the traverse of the mandrels; or as suggested above the invention illustrated may be embodied in a machine organized, if desired, to perform all or any of the functions described by the various agencies working upon the material on the mandrels in one or two or more independent series, each series ending if desired at an aperture 43 delivering a blast to eject the receptacles from the machine. It is within the invention, for instance, to strip the mandrels of their bags formed of blanks L, and then to make boxes of blanks C on the bare mandrels, machines of the genus illustrated being adaptable to make two, or more, products, either separately or conjointly as above described. The mechanism is adaptable by changes capable of performance by persons of ordinary skill to make bags at the table 200 as well as at the table 100; or to make boxes at the table 100 as well as at the table 200. Intended products, therefore, comprise not only the lined cartons illustrated in order to explain the invention, but also double bags or double boxes.

It will be obvious that by repeating the feeding agencies of either end of the machine at the other end, and providing an ejecting blast opening 43 at a part of the path of the mandrels between the finishing devices shown in Fig. 8 and the table 200, that the machine may be readily adapted to turn out double the number of single bags or single boxes at the same operative speed as employed when making the illustrated lined cartons.

What I claim is:

1. A machine adapted to make lined receptacles having therein means for making a bag by folding and fastening together a relatively flexible sheet in combination with means constructed to operate upon box-forming material acting to form a box by bending and fastening together about the bag overlapping flaps of a relatively stiff blank.

2. A machine adapted automatically to make receptacles and to make and place linings in the receptacles having in combination therein means constructed and arranged to form a longitudinally-seamed bag of flexible material for the lining, and means containing instrumentalities constructed and adapted to act upon a relatively stiff cover of box-forming material applied in surrounding relation to the formed bag to close and fasten to each other closure flaps of the said cover.

3. A machine adapted to make lined receptacles having therein bag-making means adapted to form a bag from relatively flexible material by folding and sealing operations, and means constructed to operate upon box-forming material for forming a box from a relatively stiff shaped blank by bending and fastening together the blank on and about the bag.

4. A machine adapted to make lined receptacles having therein means to complete a bag from an unbroken sheet of material in combination with means to complete a box having a plurality of closure flaps on and about the bag, said box completing means including bending and fastening instrumentalities for said closure flaps constructed to operate upon box-forming material.

5. A machine adapted automatically to make receptacles and to make and place linings in the receptacles, having therein a mandrel defining the useful space in the receptacle, means having agencies adapted to form from suitable flexible material a longitudinally seamed bag for the lining on and about the mandrel, in combination with means having agencies adapted to fold and fasten relatively stiff blank of box-forming material on and about the formed bag prior to separating the box and lining from the mandrel.

6. A machine adapted automatically to make receptacles and to make and place linings in the receptacles having in combination therein a series of mandrels and means to move them in a circulatory path, means for applying to and about a mandrel a flexible bag having a side overlap and end folds, in combination with means adapted to act in a different part of said path upon a relatively stiff cover applied to the mandrel and completed bag to overlap and fasten together end closure flaps of said cover to close a box bottom.

7. A machine adapted automatically to make receptacles and to make and place linings in the receptacles having in combination therein a series of mandrels and means to move them in a circulatory path, means for applying to and about a mandrel a flexible bag having a side overlap and end folds, and means for sealing together the overlap and end folds of said bag, in combination with means adapted to act in a different part of said path upon a relatively stiff cover applied to the mandrel and completed bag to overlap and fasten together end closure flaps of said cover to make a box.

8. In a receptacle making machine, a series of mandrels, means for successively feeding and applying flexible lining-bag blanks to said mandrels, means for acting on said applied blanks to make and seal a longitudinal seam and closed end-folds, in combination with means acting in relation to mandrels carrying completed lining bags for closing upon the lining bag supported by the mandrel a stiff covering box, and means for fastening together overlapped flaps of said covering box comprising means for compressing together overlaps of the cover in relation to the mandrel and the bag carried thereby.

9. A receptacle making machine having therein a series of mandrels, and means acting simultaneously to lap a blank for an inner receptacle or receptacles about one or more of said mandrels, and to lap a cover about a mandrel bearing a previously formed receptacle, the overlaps being on different sides of the mandrel.

10. A receptacle making machine having therein a mandrel and means acting successively to lap about and fasten a receptacle blank to complete a receptacle on the mandrel and to form a cover for the receptacle having a continuous side opposite overlaps of such blank about the receptacle and mandrel.

11. A machine for making complete covered receptacles having therein lining applying means, cover applying means, a mandrel forming an element of each of said means, and means for supporting sheets respectively for the lining and cover for primary folding by applying means coacting with respectively opposite sides of the mandrel.

12. A machine for making lined receptacles having therein in combination a mandrel, means for causing a flexible lining to be placed on the mandrel, means for folding and creasing the lining about and by the mandrel, means for fastening the lining together to complete a bag and means for forming the remainder of the receptacle comprising means for folding and fastening together closure flaps of a pre-creased relatively stiff box blank on and about the lining and the mandrel.

13. A receptacle making machine having therein a series of mandrels, and automatic means severally acting to feed material for and to form inner receptacles about said mandrels in turn and to feed material for and form covers about the mandrels bearing the previously formed receptacle, said feeding means delivering portions of material for encounter by respectively different faces of each mandrel.

14. A receptacle making machine having therein a mandrel and means for forming a lining by wrapping a blank about the mandrel, means for wrapping a cover about the mandrel and the lining, and means for causing relative movement in different directions in respect to the mandrel between said mandrel and said respective means, whereby to overlap the respective blanks each on a different side of the mandrel.

15. A receptacle making machine having therein, in combination, means to lap a lining about a mandrel, means to apply a cover to a mandrel, and means for causing a mandrel to receive a lining at the lining applying means, and then to receive the middle part of a cover upon the overlapped edges of the lining at the cover applying means.

16. A machine for making receptacles having therein means for positioning blanks for a plurality of different layers of the walls of the receptacle, a mandrel, and means for moving the mandrel from the place of blanks for one layer to the place of the blanks for another layer, means for forming the respective blanks on the mandrel, and means for causing different faces of the mandrel to lead when approaching the respective blanks.

17. A machine for making receptacles having therein means for severally feeding and forming flexible and stiff blanks for a plurality of different layers of the walls of the receptacle, a mandrel, means adapted to fold the relatively flexible blanks and means adapted to fold the relatively stiff blanks in respective layers about the mandrel, and means for moving the mandrel from the place of delivery of blanks for one layer to the place of delivery of blanks for another layer.

18. A machine adapted to make lined receptacles automatically having therein means to make and fasten together a longitudinally seamed bag having a bottom closure, and means for forming and fastening together on and about the bag a box having a plurality of end-closure flaps.

19. A machine adapted to make lined receptacles having therein means to complete a longitudinally seamed bag having a folded bottom closure formed on and creased about a mandrel, and means for forming and closing on and about the bag a box from a pre-creased blank of relatively stiff box material having a least one end closed by overlapped flaps.

20. A machine adapted to make lined receptacles on mandrels comprising means for moving the mandrels successively from a bag-making to a box-making position, in combination with bag-material feeding, folding and end-closure making means, and with box-blank feeding, bending and flap-fastening means constructed to operate upon relatively stiff carton stock material to make a box, and operative at said positions respectively.

21. A receptacle making machine having therein means severally for positioning receptacle blanks of different kinds, each blank adapted to form a complete receptacle when folded and fastened, a series of mandrels, means for causing relative motion between the positioning means and the mandrels, adapted to cause approach of a different face of the mandrel and the blank at successive encounters of blank and mandrel, and means operating as a consequence of such motion for severally wrapping and fastening the said different blanks about each mandrel in succession in a different position in respect to the mandrel.

22. A receptacle making machine having therein a plurality of means severally for positioning receptacle blanks of different kinds, each blank adapted to form a complete receptacle when folded and fastened, a mandrel, means adapted to cause approach of a different face of the mandrel and the blank at successive encounters of blank and mandrel, for moving the mandrel past the respective positioning means, and means operating as a consequence of such motion for applying a blank to the mandrel and fastening it together to form a receptacle at each of said positioning means in a different relation to the mandrel.

23. A receptacle making machine having therein a series of mandrels and means for moving the mandrels in a circulatory path, in combination with means for applying receptacle blanks to the mandrels at different parts of their path of circulation and means for severally folding the applied blanks into predetermined form on said mandrels while the mandrels are in motion in said path.

24. A receptacle making machine having therein a series of mandrels, a plurality of means for applying a succession of blanks to the same mandrel, means for circulating the mandrels in respect to the applying and folding means in a constant path, and means for severally folding the applied blanks acting in the plane defined by said path in respect to mandrels moving in said path.

25. A receptacle making machine having therein a series of mandrels and means for moving the mandrels continuously in a circulatory path, in combination with means for applying a succession of receptacle blanks to each mandrel at different parts of their path of circulation, means for folding the applied blanks into predetermined form on said mandrels, and means for fastening the seams so formed, said folding and fastening means cooperating with mandrels in motion in said path.

26. A receptacle making machine having therein a series of mandrels, means to drive the mandrels at spaced distances apart in a circulatory polygonal path, like points on the mandrels traveling in the same plane, means for supplying material in the path of the mandrels to be wrapped about the mandrels to form a receptacle, and means for wrapping the material about the mandrel having operative elements moving in a direction parallel to said plane.

27. A receptacle making machine having therein a series of mandrels and means for moving the mandrels in a circulatory path defining a plane, in combination with means for applying a succession of receptacle blanks to each mandrel at different parts of their path of circulation, means for folding the applied blanks into predetermined form on said mandrels, said means acting in directions lying in and parallel to said plane only, and means for fastening the seams so formed prior to placing on each mandrel a second blank.

28. A receptacle making machine having therein a series of mandrels, means for moving the mandrels in a circulatory path having parts lying in different directions, and positive means for predetermining like position of the mandrels at parts of said path lying in different directions.

29. A receptacle making machine having therein a series of mandrels defining the inner useful space of the completed receptacles, means for moving every point of the mandrels in a segment of a polygonal circulatory path parallel with that of every other point, and means for applying material to different faces of the mandrels at different parts of said path during such parallel motion.

30. A receptacle making machine having therein a series of mandrels, and means for moving them in a polygonal circulatory path, and means for severally orienting the mandrels in the same predetermined direction at two or more different places in said path in respect to means for working on material for the receptacle carried by the mandrel at said places.

31. A receptacle making machine having therein a series of mandrels, carriers for the mandrels, flexible means to drive the carriers in a circulatory path, like points on the mandrels traveling in the same plane, means for supplying material in the path of the mandrels to be wrapped about the mandrels to form a receptacle, and means for wrapping the material about the mandrel having operative elements moving in a direction parallel to said plane.

32. A receptacle making machine having therein a series of rotatably supported mandrels, carriers for the mandrels, means for driving the carriers in a predetermined path, means for holding the mandrels against rotation about axes lying in three dimensions and means for rotating the mandrels on one of their axes at places in said path.

33. A receptacle making machine having therein a series of carriers, mandrels adapted to rotate in the carriers, means for driving the carriers in a predetermined path, and means for predetermining a fixed rotative position of each of said mandrels in respect to the remainder of the machine at respective parts of said path lying in different directions.

34. A receptacle making machine having therein a series of mandrels, means for moving them in a polygonal circulatory path, and means acting at a plurality of the sides disposed at an angle to each other of said polygonal path to form material about the mandrels.

35. A receptacle making machine having therein a series of mandrels, and means for moving them in a polygonal circulatory path, and means acting on the mandrels for orienting the mandrels in a predetermined direction in respect to the remainder of the machine and holding them in said direction at one or more places in said path.

36. A receptacle making machine having therein a series of carriers, mandrels adapted to rotate in the carriers, means for driving the carriers in a predetermined circulatory path, blank supporting means severally intersected by said path at different parts going in different directions, and means for holding the said mandrels in the same rotative position in relation to said supporting means at said respective parts of said path.

37. A receptacle making machine having therein a series of mandrels defining all but one side of the interior space of the receptacle to be made, carriers for the mandrels, means for driving the carriers continuously in a predetermined path, and means for applying blanks of different material to the faces of the mandrel during their motion in said path.

38. A receptacle making machine having therein a series of rotatable mandrels, carriers for the mandrels, a track for the carriers, and means for driving the carriers continuously along said track in combination with means for wrapping and fastening receptacle blanks about the mandrels during their motion.

39. A receptacle making machine having therein a series of mandrels, carriers for the mandrels, a track for the carriers, flexible connecting means for driving and spacing the carriers along said track, and interlocking means between the carriers and the track.

40. A receptacle making machine having therein a frame, and means for forming receptacles comprising a track, a series of carriers, mandrels adapted to rotate in respect to the carriers, means for driving the carriers along the track, and means for predetermining the rotative position of each of said mandrels at respective parts of said track having coacting parts fixed to said frame and moving with the mandrels respectively.

41. A receptacle making machine having therein a series of carriers, means comprising a polygonal track about which the carriers are adapted to slide, mandrels rotatably held by the carriers, and driving means connecting and spacing the carriers for successive passage at different parts of the track at predetermined intervals of time.

42. A receptacle making machine having therein a series of carriers, means comprising a polygonal track about which the carriers are adapted to slide, mandrels rotatably held by the carriers, constantly actuated driving means connecting and spacing the carriers for successive passage at different parts of the track at predetermined intervals of time, and means coacting with the moving mandrels to form a receptacle upon and about each of them.

43. A receptacle making machine having therein a series of carriers, means establishing a polygonal track about which the carriers are adapted to be circulated, mandrels rotatably held by the carriers, and driving means connecting and spacing the carriers for successive passage at different parts of the track at predetermined intervals of time, in combination with means for delivering blanks in the path of the mandrels at said parts of the track.

44. A receptacle making machine having therein a series of mandrels defining three-dimensional geometrical solids, and means for moving the mandrels successively about a four-sided path, in a plane perpendicular to a major axis of the mandrel, all of the faces of mandrels except one being exposed to receive material for the receptacles, means for positioning a blank across said path, and means for lapping the blank about the mandrel.

45. A receptacle making machine having therein a series of mandrels, a plurality of means for applying blanks to the mandrels, means for circulating the mandrels in respect to the applying means, means for orienting the mandrels for passage of the applying means respectively with different faces leading, and means for supplying blanks to be carried by and formed upon the mandrels.

46. A receptacle making machine having therein a series of mandrels, and means for moving the mandrels in a plane circulatory path, in combination with means for positioning receptacle blanks in said path to be encountered severally by the mandrels at different parts of their path of circulation, and means for folding the blanks into predetermined form on the mandrels including primary folding means for detaining overlapping edges of the blank in respect to the moving mandrel.

47. A receptacle making machine having therein a mandrel, means for circulating the mandrel in a path having parallel end runs, one of which is an ascending run, and means for supporting a blank to be placed on the mandrel across the path taken by said mandrel during its ascent.

48. A receptacle making machine having therein a mandrel, means for circulating the mandrel in a path having an ascending run, means for supporting a blank across in the path taken by said mandrel during its ascent, and means for applying the blank to the lower face of the mandrel during its ascent.

49. A receptacle making machine having therein a series of mandrels, means to circulate said series in a polygonal path, means to apply a blank to the mandrel at one face of the polygonal path, and means operating on the applied blank on the mandrel at another face of said path to close a seam in the material applied to the mandrel.

50. A receptacle making machine having therein a series of mandrels, and means for positioning and applying blanks severally to the mandrels; means for causing relative motion in two dimensions between the series of mandrels and said means for applying blanks; whereby mere relative movement between said positioning and applying means and said mandrels folds a blank on said mandrels in primary longitudinal folds about the mandrel; means coacting with the mandrel after said passage to lap the blank together about the mandrel; means to control the rotative position of said mandrels severally in respect to axes lying in a third dimension, for proper presentation to said applying means, and means cooperating with an end face of the mandrel to close upon it the part of the blank projecting thereover.

51. A receptacle making machine having therein a series of mandrels, means for applying blanks having thereon an area of fusible material to the mandrels, primary means for folding the applied blanks on the mandrels, means for circulating the mandrels in respect to the applying and folding means, and heating means acting after the passage of the folding means for sealing a seam in the folded blank.

52. A receptacle making machine having therein a series of mandrels, means for moving the mandrels in a circulatory path, in combination with a plurality of means for applying blanks adapted to form a complete receptacle to the mandrels, means at different parts of their path of circulation for severally wrapping the applied blanks into predetermined form primarily in respect to different faces of said mandrels, and means for fastening the seams so formed.

53. A receptacle making machine having therein a series of mandrels each defining a polyhedral solid, carrier means for moving the mandrels at an angle to their longer axes in a circulatory path, means for predetermining different relative positions of the mandrels at different parts of said path, means for feeding a blank to be encountered and bent about the mandrel into primary folds, and blank-folding means including means for following the receding face of a mandrel during recession of the mandrel in a constant position in respect to the horizontal to apply thereto the inner lap of the blank, whereby to form a tubular stage of the receptacle.

54. A receptacle making machine having therein a series of mandrels, means for applying different kinds of blanks to the mandrels, means for folding the applied blanks, means for circulating the mandrels in respect to the applying and folding means, and static seam-sealing means operating on said several kinds of blanks severally on faces of the mandrel lying in different directions.

55. A receptacle making machine having therein a series of mandrels, means for moving the mandrels in a circulatory path, in combination with means for applying receptacle blanks to the mandrels at different parts of their path of circulation, means for folding the applied blanks into predetermined form on said mandrels, means for fastening the seams so formed, including stationary seam-sealing means, and relatively stationary means for applying pressure to the seamed portion of the blanks during movement of the mandrels following the place of operation of said sealing means.

56. A receptacle making machine having therein a series of mandrels, means for moving the mandrels in a circulatory path, and means adapted to feed shaped box blanks into the path of the mandrels, said means being adjustable to deliver blanks placed in normal or in reversed position, in combination with means acting upon the blank to fold it into useful form when fed in either position.

57. A receptacle making machine having therein mandrels upon which cut blanks for boxes of the kind having separated end closure flaps are adapted to be formed and fastened, means for forming and fastening the boxes, and means for feeding the blanks successively to the forming means comprising means to separate a single blank from a stack of blanks, said means moving in the direction of the flap-separating cuts.

58. A receptacle making machine having therein mandrels upon which cut blanks for boxes of the kind having separated end closure flaps are adapted to be formed and fastened, means for forming and fastening the boxes, including positioning means for the blanks, and means for causing the mandrels to pass the positioning means and encounter the blanks successively, in combination with means for feeding the box-blanks in a flat state in the direction of the primary folds of the box, means for bending the blank for one fold parallel with the primary folds during feeding, and means for bending another parallel fold of the box about the mandrel during motion of the blank with the mandrel.

59. A receptacle making machine having therein mandrels upon which cut blanks for boxes of the kind having separated end closure flaps are adapted to be formed and fastened, means for forming and fastening the boxes, including positioning means for the blanks, and means for causing the mandrels to pass the positioning means and encounter the blanks successively in combination with means for feeding the box blanks in a flat state to the positioning means, means for bending the blank for one fold during feeding, and means for bending other parallel folds of the box about the mandrel during motion of the blank with the mandrel.

60. A machine for making receptacles having therein a mandrel defining the useful space in the receptacle, means to move the mandrel successively in two dimensions, means to control the mandrel in respect to rotation about an axis lying in a third dimension during such motion; positioning means for a receptacle blank adapted to be traversed by the mandrel during motion in the first of said dimensions, whereby to fold a blank thereon in primary longitudinal folds about the then leading and lateral faces of the mandrel; means coacting with the following face of the mandrel to lap the blank together about the mandrel during continued motion of the mandrel, and means cooperating with an end face of the mandrel to close upon it the part of the blank projecting thereover during motion of the mandrel in the second of said dimensions.

61. A machine for making receptacles having therein a box-blank positioning means, a series of mandrels and means for moving said mandrels through said positioning means in succession and successively in two dimensions lying crosswise of their longitudinal axes whereby each mandrel will encounter the middle part of a blank placed on the positioning means, static means for folding the blanks about the sides of the mandrels, means following the motion of the mandrels to lap one of the overlapping edges of the blank over the following face of the mandrel, and means operating as a consequence of motion of the mandrel in the second of said dimensions for laying down, retaining and pressing the other edge of the blank and the overlap formed by both edges.

62. A machine for making receptacles having therein a mandrel defining the useful space in the receptacle, means to move the mandrel successively in two dimensions, means to control the mandrel in respect to rotation about an axis lying in a third dimension during such motion, positioning means for a receptacle-blank adapted to be traversed by the mandrel during motion in the first of said dimensions, whereby to fold a blank thereon in primary longitudinal folds about the then leading and lateral faces of the mandrel, means to lap and fasten the edges of the blank together for a longitudinal seam, means for turning in toward the end face of the mandrel the leading and following parts of the blank projecting therefrom during motion in the second of said dimensions, and means for turning in and fastening the remaining overhanging parts of the blank.

63. A machine for making receptacles having therein a mandrel defining the useful space in the receptacle, means to move the mandrel successively in two dimensions, means to control the mandrel in respect to rotation about an axis lying in a third dimension during such motion, positioning means for a receptacle-blank adapted to by traversed by the mandrel during motion in the first of said dimensions, whereby to fold a blank thereon in primary longitudinal folds about the then leading and lateral faces of the mandrel, means to lap and fasten the edges of the blank together for a longitudinal seam, means acting to turn the mandrel through substantially a right angle, and means for turning in toward the end face of the mandrel certain of the parts of the blank projecting therefrom during motion in the second of said dimensions, and relatively stationary means coacting with the moving mandrel and blank to turn in and fasten down the remaining parts of the blank.

64. In a receptacle making machine having a mandrel upon which receptacles are formed, means for ejecting the completed receptacle comprising means for loosening the receptacle from attachment to the mandrel, and fluid pressure means for blowing the receptacle off of the mandrel.

65. In a receptacle making machine having a hollow perforated mandrel upon which receptacles are formed, means for ejecting the completed receptacle comprising means for holding the receptacle on the mandrel, means for increasing the air-pressure within the mandrel during retention of the receptacle, whereby to strip the receptacle from local attachments to the mandrel, and means for releasing the receptacle from the holding means during maintenance of the air-pressure, whereby to blow the receptacle off of the mandrel.

66. In a receptacle making machine having a mandrel and means for fastening a seamed receptacle together on the mandrel by a fusing operation, means for removing the completed receptacle comprising means for increasing the fluid-pressure between the mandrel and the receptacle to strip attachments, means for holding the receptacle on the mandrel during said operation, and means to release the receptacle from the holding means.

67. A machine for making receptacles having therein box-blank positioning means, a mandrel, and means to move the mandrel past the positioning means and successively in two dimensions lying crosswise of the longitudinal axis of the mandrel, whereby the mandrel will laterally encounter the middle part of a blank having bottom flaps at said positioning means, means for lapping the blank about the mandrel and fastening the longitudinal seam so formed, and relatively stationary means acting during motion of the mandrel in the second of said dimensions for turning in overlapped relation and fastening the bottom flaps over the end face of the mandrel.

68. A receptacle making machine having therein a series of mandrels and means for moving the mandrels in a plane circulatory path, in combination with a horizontal support for blanks through which said path passes, means for feeding a blank on said support into the path taken by the mandrels for the purpose of engaging a mandrel with a blank, said feeding means acting to move the blank at an angle to the plane defined by the circulatory path.

69. In a receptacle making machine, a mandrel and means to cause said mandrel to travel in a predetermined continuous path, means to position a sheet of receptacle material in the path of the mandrel to be encountered by a face of the mandrel, means to lap and fasten together the material on another face of the mandrel, and means to fold together and close in the unbroken projecting end of the tube so formed against an end face of the mandrel to form an end closure of a receptacle.

70. In a receptacle making machine, a mandrel and means to cause said mandrel to travel in a predetermined path, means to position a sheet of receptacle material in the path of the mandrel to be encountered by a face of the mandrel, means to lap and fasten together the material on another face of the mandrel, and means to fold together and close in the unbroken projecting end of the tube so formed against an end face of the mandrel to form an end closure of a receptacle, in combination with means acting at another place in the path of the mandrel to fasten together the end flaps of a cover applied about the mandrel and about said first mentioned receptacle.

71. In a receptacle making machine, a mandrel and means to cause said mandrel to travel in a predetermined path, means to position a sheet of receptacle material in the path of the mandrel to be encountered by a face of the mandrel, means acting during continued motion of said mandrel to lap and fasten together material on another face of the mandrel, and means to fold together and close in the unbroken projecting end of the tube so formed against an end face of the mandrel to form an end closure of a receptacle.

72. In a receptacle making machine, a series of mandrels, in combination with means adapted to feed and apply to said mandrels successively blanks of thin, flexible lining material, said means including devices for infolding the unbroken ends of the blank against an end face of the mandrel; and in combination with means for applying a pre-scored cover having projecting and separated end-flaps, said means including devices for successively turning in and sealing together said end flaps by the application of an adhesive to one or more of them, and the exertion of pressure against the face of the mandrel supporting the end folds of the lining bag.

73. A receptacle making machine having therein a series of mandrels and means for moving said mandrels successively past the places of agencies for applying and forming a flexible lining bag on and about a mandrel, in combination with means to operate on projecting and separate side and end flaps of a covering box applied on and about a mandrel carrying a bag for successively turning in against the bottom of the mandrel-supported bag and sealing together the side and end flaps of the covering box.

Signed by me at Boston, Massachusetts, this twenty-seventh day of June, 1919.

CHARLES P. WELLMAN.